(12) United States Patent
Zeng et al.

(10) Patent No.: US 12,374,938 B2
(45) Date of Patent: Jul. 29, 2025

(54) WIRELESS CHARGING ALIGNMENT METHOD AND APPARATUS, WIRELESS CHARGING SYSTEM, AND ELECTRIC VEHICLE

(71) Applicant: HUAWEI TECHNOLOGIES CO., LTD., Guangdong (CN)

(72) Inventors: Xiaosheng Zeng, Dongguan (CN); Yunhe Mao, Shenzhen (CN); Shuangquan Chen, Dongguan (CN); Qitang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 613 days.

(21) Appl. No.: 17/502,243

(22) Filed: Oct. 15, 2021

(65) Prior Publication Data

US 2022/0069638 A1    Mar. 3, 2022

Related U.S. Application Data

(63) Continuation of application No. PCT/CN2020/070395, filed on Jan. 6, 2020.

(30) Foreign Application Priority Data

Apr. 18, 2019    (CN) .......................... 201910314533.X

(51) Int. Cl.
*H02J 50/90*    (2016.01)
*B60L 53/12*    (2019.01)
(Continued)

(52) U.S. Cl.
CPC .............. *H02J 50/90* (2016.02); *B60L 53/12* (2019.02); *B60L 53/38* (2019.02); *H02J 50/12* (2016.02)

(58) Field of Classification Search
CPC ........................................................ H02J 50/90
See application file for complete search history.

(56) References Cited

U.S. PATENT DOCUMENTS 8,362,744 B2    1/2013    Terao et al.
9,631,950 B2    4/2017    Raedy et al.
(Continued)

FOREIGN PATENT DOCUMENTS

CN    105539186 A    5/2016
CN    105634145 A    6/2016
(Continued)

OTHER PUBLICATIONS

Office Action issued in CN201910314533.X, dated May 26, 2021, 10 pages.
(Continued)

*Primary Examiner* — Tynese V McDaniel

(57) ABSTRACT

The technology of this disclosure relates to a wireless charging alignment method and apparatus, a wireless charging system, and an electric vehicle, and belongs to the field of wireless charging. In the wireless charging alignment apparatus, a first detection circuit may detect a first induction signal of a power receive coil in a positioning magnetic field generated by a power transmit coil; a second detection circuit may detect a second induction signal of a location detection coil in the positioning magnetic field; and a location determining circuit may determine a location of the power receive coil relative to the power transmit coil based on the first induction signal and the second induction signal.

20 Claims, 9 Drawing Sheets

(51) Int. Cl.
  *B60L 53/38* (2019.01)
  *H02J 50/12* (2016.01)

(56) References Cited

U.S. PATENT DOCUMENTS

| | | | | |
|---|---|---|---|---|
| 2012/0235506 | A1* | 9/2012 | Kallal | H02J 50/80 |
| | | | | 307/104 |
| 2013/0033224 | A1 | 2/2013 | Raedy | |
| 2014/0015328 | A1* | 1/2014 | Beaver | H02J 7/34 |
| | | | | 307/104 |
| 2015/0061578 | A1* | 3/2015 | Keeling | B60L 53/122 |
| | | | | 320/108 |
| 2015/0137801 | A1* | 5/2015 | Raedy | B60L 53/126 |
| | | | | 324/207.15 |
| 2017/0259680 | A1* | 9/2017 | Seong | H02J 50/12 |
| 2017/0361113 | A1* | 12/2017 | Aghassian | H02J 50/12 |
| 2017/0361726 | A1 | 12/2017 | Widmer et al. | |
| 2020/0313470 | A1* | 10/2020 | Uchimoto | H02J 50/80 |
| 2021/0408836 | A1* | 12/2021 | Smith | H02J 50/12 |

FOREIGN PATENT DOCUMENTS

| | | |
|---|---|---|
| CN | 106160260 A | 11/2016 |
| CN | 205921464 U | 2/2017 |
| CN | 205945249 U | 2/2017 |
| CN | 106541844 A | 3/2017 |
| CN | 106574949 A | 4/2017 |
| CN | 107181329 A | 9/2017 |
| CN | 107394832 A | 11/2017 |
| CN | 108151635 A | 6/2018 |
| CN | 207496493 U | 6/2018 |
| CN | 108725239 A | 11/2018 |
| CN | 109017426 A | 12/2018 |
| CN | 109067020 A | 12/2018 |
| CN | 109532526 A | 3/2019 |
| CN | 109606176 A | 4/2019 |
| JP | 2017143639 A | 8/2017 |
| WO | 2014014615 A1 | 1/2014 |

OTHER PUBLICATIONS

Notice of Allowance issued in CN201910314533.X, dated Nov. 2, 2021, 5 pages.
International Search Report and Written Opinion issued in PCT/CN2020/070395, dated Apr. 2, 2020, 10 pages.
European Search Report for European Application No. 20791587.7 dated Apr. 28, 2022, 9 pages.

* cited by examiner

WIRELESS CHARGING ALIGNMENT METHOD AND APPARATUS, WIRELESS CHARGING SYSTEM, AND ELECTRIC VEHICLE

CROSS-REFERENCE TO RELATED APPLICATIONS

This application is a continuation of International Application No. PCT/CN2020/070395, filed on Jan. 6, 2020, which claims priority to Chinese Patent Application No. 201910314533.X, filed on Apr. 18, 2019. The disclosures of the aforementioned applications are hereby incorporated by reference in their entireties.

TECHNICAL FIELD

This application relates to the wireless charging field, and in particular, to a wireless charging alignment method and apparatus, a wireless charging system, and an electric vehicle.

BACKGROUND

Wireless charging (WPT) is a technology in which electric energy is transmitted by using a coupling electromagnetic field as a medium, to charge an in-vehicle power supply of an electric vehicle. Compared with conventional contact charging, the wireless charging has the following advantages: easy to use, no spark, no electric shock risk, no mechanical wear, adaptable to a plurality of severe environments and weather, automatic charging and mobile charging, and the like. Therefore, the wireless charging is widely applied.

In a related technology, a wireless charging system generally includes: a power transmit device disposed on the ground or under the ground, and a power receive device disposed at the bottom of an electric vehicle. The power transmit device includes a power transmit coil, and the power receive device includes a power receive coil. After a driver drives the electric vehicle to align the power receive coil with the power transmit coil, the power transmit coil may transmit power to the power receive coil in an electric field coupling manner or a magnetic field coupling manner. In addition, higher alignment precision between the power transmit coil and the power receive coil indicates higher efficiency of power transmission between the two coils and higher charging efficiency.

However, in the related technology, the driver needs to visually measure a relative location of the two coils, and drive the electric vehicle based on the relative location, to align the two coils. Alignment precision in this alignment method is relatively low.

SUMMARY

This application provides a wireless charging alignment method and apparatus, a wireless charging system, and an electric vehicle, to resolve a problem of relatively low alignment precision in an alignment method in a related technology. Technical solutions are as follows:

According to an aspect, this application provides a wireless charging alignment apparatus, including a power receive coil, a location detection coil, a first detection circuit, a second detection circuit, and a location determining circuit. The power receive coil is configured to exchange power with a power transmit coil of a transmit end through electromagnetic mutual inductance. The first detection circuit is configured to detect a first induction signal of the power receive coil in a positioning magnetic field generated by the power transmit coil. The second detection circuit is configured to detect a second induction signal of the location detection coil in the positioning magnetic field. The location determining circuit is configured to determine a location of the power receive coil relative to the power transmit coil based on the first induction signal and the second induction signal.

In the related technology, a driver visually measures a relative location of the two coils. In comparison with the related technology, in this embodiment of this application, both precision and efficiency of determining the relative location based on the induction signals are higher. Therefore, alignment precision and alignment efficiency of the two coils can be effectively improved.

Optionally, the wireless charging alignment apparatus may be applied to a receive end (that is, a power receive device) in a wireless charging system, or may be applied to a transmit end (that is, a power transmit device) in a wireless charging system. In addition, in the wireless charging system, the transmit end and the receive end may be interchanged. In other words, the receive end may also charge the transmit end. When the wireless charging alignment apparatus is applied to the transmit end, or when the transmit end and the receive end are interchanged, the power receive coil described above may also be referred to as a power transmit coil, and the power transmit coil may also be referred to as a power receive coil.

Optionally, the location determining circuit may be configured to determine, as the location of the power receive coil relative to the power transmit coil based on a correspondence between an offset location and each of an induction signal of the power receive coil and an induction signal of the location detection coil, an offset location corresponding to the first induction signal and the second induction signal.

The relative location of the two coils is determined based on the correspondence, to effectively improve efficiency of determining the relative location, thereby further ensuring alignment efficiency.

Optionally, a plurality of signal groups and an offset location corresponding to each signal group may be recorded in the correspondence. Each signal group may include a signal value of the induction signal of the power receive coil and a signal value of the induction signal of the location detection coil. The location determining circuit may be configured to: determine a first difference between a signal value of the first induction signal and the signal value of the induction signal of the power receive coil in each signal group, and a second difference between a signal value of the second induction signal and the signal value of the induction signal of the location detection coil in each signal group, to obtain the first difference and the second difference of each signal group; and determine, as the offset location corresponding to the first induction signal and the second induction signal, an offset location corresponding to a signal group whose sum of the first difference and the second difference is the smallest in the plurality of signal groups.

In other words, after obtaining the first induction signal and the second induction signal, the location determining circuit may determine, as the offset location corresponding to the first induction signal and the second induction signal, an offset location corresponding to a signal group that is in the correspondence and that is closest to the signal values of the two induction signals, to ensure detection precision and reliability. Herein, the signal group and the offset location may be recorded in the correspondence in a form of a table.

Optionally, the location determining circuit may be configured to: determine a coupling coefficient between the power receive coil and the power transmit coil based on the first induction signal and a current or a voltage of the power transmit coil; and determine the location of the power receive coil relative to the power transmit coil based on the coupling coefficient and the second induction signal.

For example, the location determining circuit may determine, as the location of the power receive coil relative to the power transmit coil based on a pre-stored correspondence between the offset location and each of a coupling coefficient and the induction signal of the location detection coil, the offset location corresponding to the currently detected coupling coefficient and the second induction signal.

Optionally, the location determining circuit may be configured to: separately preprocess the first induction signal and the second induction signal, and determine the location of the power receive coil relative to the power transmit coil based on the preprocessed first induction signal and the preprocessed second induction signal. The preprocessing may include at least one of normalization processing and weighting processing.

Because the first induction signal and the second induction signal may be different physical quantities or amplitudes of signal values of the first induction signal and the second induction signal have relatively large difference therebetween, the amplitudes of the signal values of the induction signals may be relatively close by preprocessing the induction signals, thereby improving precision and efficiency of subsequently determining the relative location based on the induction signals.

Optionally, each of the first induction signal, the second induction signal, the induction signal of the power receive coil, and the induction signal of the location detection coil may include at least one of a current and a voltage. In addition, a type of the first induction signal is the same as a type of the induction signal of the power receive coil in the correspondence, and a type of the second induction signal is the same as a type of the induction signal of the location detection coil in the correspondence.

For example, the first induction signal may be a current or a voltage, and the first detection circuit may be configured to detect only one type of signal (for example, a voltage), to reduce detection costs. Alternatively, the first induction signal may include a current and a voltage, and the first detection circuit may be configured to detect many types of signals (for example, a current and a voltage), to ensure detection reliability.

Optionally, the first induction signal includes a current. The apparatus may further include a resonant element and a first switch. The power receive coil is connected to the resonant element to form a resonant circuit. The first switch is connected in parallel to the resonant circuit. The first detection circuit is configured to: when the first switch is closed, detect a current flowing through the resonant circuit.

Optionally, the resonant element may include: an inductor connected in series to the power receive coil and a capacitor connected in parallel to the power receive coil. The current may include at least one of an inductance current flowing through the inductor and a capacitor current flowing through the capacitor.

For example, the first detection circuit may include two current detection circuits. One current detection circuit may be configured to detect the inductance current, and the other direction circuit may be configured to detect the capacitor current.

Optionally, the first induction signal includes a current. The apparatus further includes a second switch. The second switch is connected in parallel to the power receive coil. The first detection circuit is configured to: when the second switch is closed, detect a short-circuit current flowing through the power receive coil.

In this embodiment of this application, the current detected by the first detection circuit may include at least one of an inductance current, a capacitor current, and a short-circuit current. Because the inductance current, the capacitor current, and the short-circuit current are relatively easy to detect, and detection precision is relatively high, the at least one of the detected inductance current, the detected capacitor current, and the detected short-circuit current is used as the first induction signal, thereby ensuring precision of the obtained first induction signal.

Optionally, the first induction signal includes a voltage. The apparatus may further include a third switch. The third switch is connected between the power receive coil and a subsequent circuit of the power receive coil. The first detection circuit is configured to: when the third switch is opened, detect an open-circuit voltage between two ends of the power receive coil.

For example, the first detection circuit may include a voltage detection circuit configured to detect the open-circuit voltage. The open-circuit voltage detected by the voltage detection circuit may be an alternating current voltage.

According to another aspect, this application provides a wireless charging alignment method. The method may be applied to the wireless charging alignment apparatus in the foregoing aspect. The method may include: detecting a first induction signal of a power receive coil in a positioning magnetic field generated by a power transmit coil; detecting a second induction signal of a location detection coil in the positioning magnetic field; and determining a location of the power receive coil relative to the power transmit coil based on the first induction signal and the second induction signal, where the power receive coil is configured to exchange power with the transmit coil of a transmit end through electromagnetic mutual inductance.

Optionally, the process of determining a location of the power receive coil relative to the power transmit coil based on the first induction signal and the second induction signal may include:
    determining, as the location of the power receive coil relative to the power transmit coil based on a correspondence between an offset location and each of the induction signal of the power receive coil and the induction signal of the location detection coil, an offset location corresponding to the first induction signal and the second induction signal.

Optionally, a plurality of signal groups and an offset location corresponding to each signal group may be recorded in the correspondence. Each signal group includes a signal value of the induction signal of the power receive coil and a signal value of the induction signal of the location detection coil.

The process of determining, based on a correspondence between an offset location and each of the induction signal of the power receive coil and the induction signal of the location detection coil, an offset location corresponding to the first induction signal and the second induction signal may include:

determining a first difference between a signal value of the first induction signal and the signal value of the induction signal of the power receive coil in each signal group, and a second difference between a signal value of the second induction signal and the signal value of the induction signal of the location detection coil in each signal group, to obtain the first difference and the second difference of each signal group; and determining, as the offset location corresponding to the first induction signal and the second induction signal, an offset location corresponding to a signal group whose sum of the first difference and the second difference is the smallest in the plurality of signal groups.

Optionally, the process of determining a location of the power receive coil relative to the power transmit coil based on the first induction signal and the second induction signal may include:
determining a coupling coefficient between the power receive coil and the power transmit coil based on the first induction signal and a current or a voltage of the power transmit coil; and determining the location of the power receive coil relative to the power transmit coil based on the coupling coefficient and the second induction signal.

Optionally, the process of determining a location of the power receive coil relative to the power transmit coil based on the first induction signal and the second induction signal may include:
separately preprocessing the first induction signal and the second induction signal, where the preprocessing includes at least one of normalization processing and weighting processing; and determining the location of the power receive coil relative to the power transmit coil based on the preprocessed first induction signal and the preprocessed second induction signal.

Optionally, the first induction signal includes a current. The power receive coil is connected to a resonant element to form a resonant circuit. The first switch is connected in parallel to the resonant circuit. The process of detecting a first induction signal of a power receive coil in a positioning magnetic field generated by a power transmit coil may include: controlling the first switch to be closed, and detecting a current flowing through the resonant circuit.

Optionally, the first induction signal includes a current. The power receive coil is connected in parallel to a second switch. The process of detecting a first induction signal of a power receive coil in a positioning magnetic field generated by a power transmit coil may include: in a first time period, controlling the second switch to be closed, and detecting a short-circuit current flowing through the power receive coil.

The process of detecting a second induction signal of a location detection coil in the positioning magnetic field may include: in a second time period, controlling the second switch to be opened, and detecting the second induction signal of the location detection coil in the positioning magnetic field, where the second time period and the first time period are two non-overlapping time periods.

After the second switch is closed, the short-circuit current flowing through the power receive coil is an alternating current. In this case, a magnetic field generated by the alternating current causes interference to the second induction signal. Therefore, the first induction signal and the second induction signal are respectively detected in the first time period and the second time period in a time division manner, thereby ensuring accuracy of the detected induction signals.

Optionally, the first induction signal includes a voltage. The power receive coil may be connected to a subsequent circuit of the power receive coil by using a third switch. The process of detecting a first induction signal of a power receive coil in a positioning magnetic field generated by a power transmit coil may include: controlling the third switch to be opened, and detecting an open-circuit voltage between two ends of the power receive coil.

According to still another aspect, this application provides a wireless charging system. The wireless charging system includes: a power transmit device and a power receive device. At least one of the power transmit device and the power receive device includes the wireless charging alignment apparatus according to the foregoing aspect.

According to further another aspect, this application provides an electric vehicle. The electric vehicle may include the wireless charging alignment apparatus according to the foregoing aspect.

According to further another aspect, this application provides a location determining circuit in a wireless charging alignment apparatus. The location determining circuit may include a memory, a processor, and a computer program that is stored in the memory and that can be run on the processor. When executing the computer program, the processor implements the step of determining a location of the power receive coil relative to the power transmit coil in the wireless charging alignment method according to the foregoing aspect.

According to further another aspect, this application provides a computer readable storage medium. The computer readable storage medium stores an instruction. When the instruction stored in the computer readable storage medium is run on a computer, the computer is enabled to perform the step of determining a location of the power receive coil relative to the power transmit coil in the wireless charging alignment method according to the foregoing aspect.

According to further another aspect, this application provides a computer program product including an instruction. When the computer program product is run on a computer, the computer is enabled to perform the step of determining a location of the power receive coil relative to the power transmit coil in the wireless charging alignment method according to the foregoing aspect.

In conclusion, the embodiments of this application provide the wireless charging alignment method and apparatus, the wireless charging system, and the electric vehicle. The location determining circuit in the apparatus may determine the location of the power receive coil relative to the power transmit coil based on the induction signals detected by the detection circuit. In this way, at least one of the receive end and the transmit end can adjust its location based on the relative location, so that the two coils are aligned. In the related technology, a driver visually measures a relative location of the two coils. In comparison with the related technology, in this embodiment of this application, both precision and efficiency of determining the relative location based on the induction signals are higher. Therefore, alignment precision and alignment efficiency of the two coils can be effectively improved. In addition, because the apparatus can detect the second induction signal of the location detection coil by using the second detection circuit, and can also detect the first induction signal of the power receive coil by using the first detection circuit, precision of the relative location determined by the location determining circuit based on the two types of induction signals is higher, thereby effectively ensuring alignment precision of the two coils.

DESCRIPTION OF EMBODIMENTS

The following describes in detail a wireless charging alignment method and apparatus, an electric vehicle, and a wireless charging system according to the embodiments of this application with reference to the accompany drawings.

Figure 1:
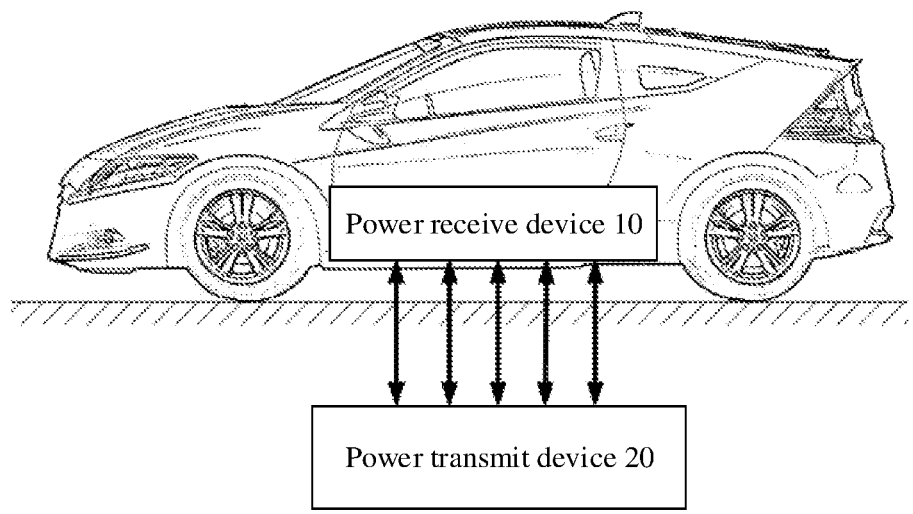
FIG. 1 is an example architectural diagram of a wireless charging system according to an embodiment of this application.

FIG. 1 is an architectural diagram of a wireless charging system according to an embodiment of this application. Referring to FIG. 1, the wireless charging system may include a power receive device 10 (e.g., a receive end) and a power transmit device 20 (e.g., a transmit end). The power receive device 10 may be disposed in a to-be-charged device. The to-be-charged device may be an electricity-driven device such as an electric vehicle or an electric robot. For example, the to-be-charged device shown in FIG. 1 is an electric vehicle, and the power receive device 10 is integrated at the bottom of the electric vehicle. The power transmit device 20 may be disposed in an area such as a wireless charging station, a wireless charging parking space, or a wireless charging road; and the power transmit device 20 may be disposed on the ground, or may be buried under the ground (FIG. 1 shows a case in which the power transmit device 20 is buried under the ground). The power receive device 10 may be connected to a power supply of the to-be-charged device, and the power transmit device 20 may be connected to a power supply. When the to-be-charged device enters a wireless charging range of the power transmit device 20, the power supply may charge the power supply of the to-be-charged device by using the power transmit device 20 and the power receive device 10.

Optionally, the power receive device 10 and the power transmit device 20 may exchange power in an electromagnetic induction manner. In addition, the power supply and the power supply of the to-be-charged device may further implement bidirectional charging by using the power receive device 10 and the power transmit device 20. To be specific, the power supply may charge the power supply of the to-be-charged device by using the power transmit device 20 and the power receive device 10, or the power supply of the to-be-charged device may discharge to the power supply by using the power transmit device 20 and the power receive device 10.

Figure 2:
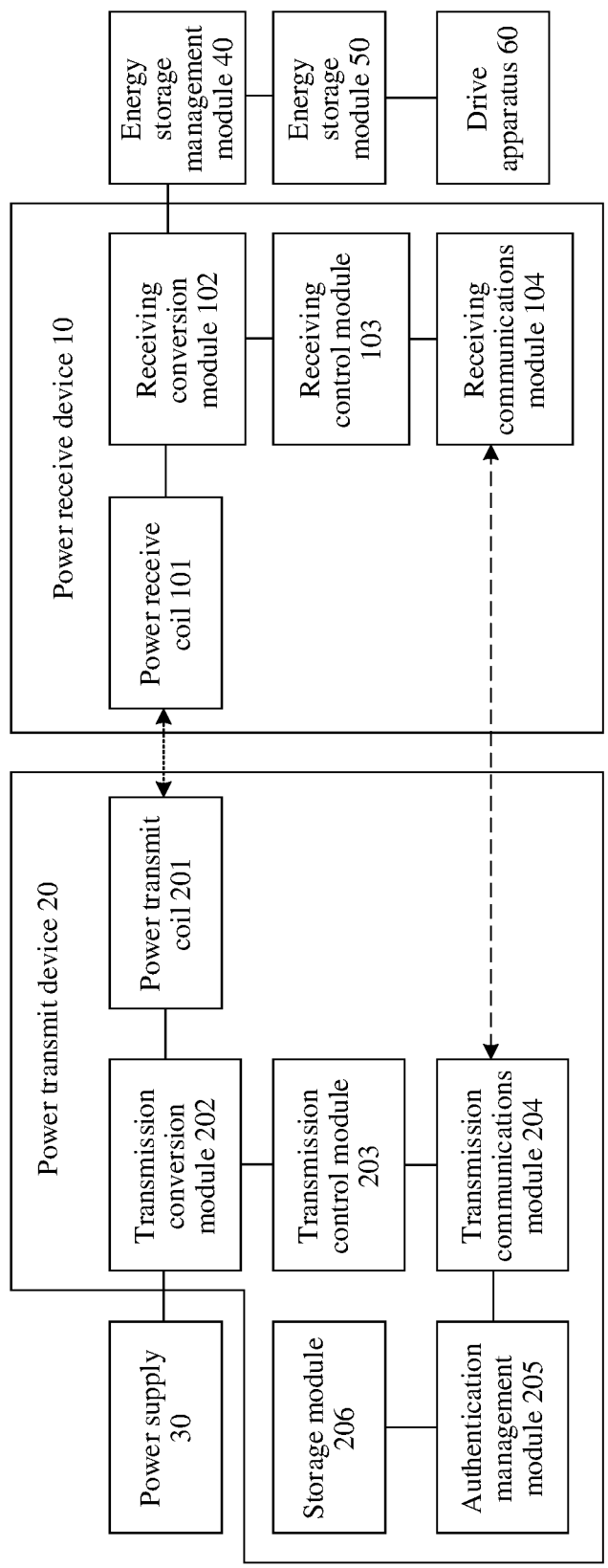
FIG. 2 is an example architectural diagram of another wireless charging system according to an embodiment of this application.

FIG. 2 is an architectural diagram of another wireless charging system according to an embodiment of this application. Referring to FIG. 2, the power transmit device 20 may include a power transmit coil 201, a transmission conversion module 202, a transmission control module 203, a transmission communications module 204, an authentication management module 205, and a storage module 206.

The power transmit coil 201 and a resonant element that mainly includes an inductor and a capacitor can form a resonant circuit. The power transmit coil 201 is configured to convert a high-frequency alternating current into a resonant voltage or a resonant current by using the resonant circuit.

The transmission conversion module 202 is separately connected to a power supply 30 and the power transmit coil 201, and is configured to: convert an alternating current or a direct current provided by the power supply 30 into a high-frequency alternating current, and provide the high-frequency alternating current to the power transmit coil 201. If the power supply 30 provides a direct current, the transmission conversion module 202 may include an inverter circuit and a voltage conversion circuit. If the power supply 30 provides an alternating current, the transmission conversion module 202 may include a power factor correction circuit and an inverter circuit.

The inverter circuit may be integrated with the power transmit coil 201, or may be disposed independently. The power factor correction circuit can be used to ensure that an input current phase of the wireless charging system is consistent with a power grid voltage phase, to reduce system harmonic content and increase a power factor value, thereby reducing pollution from the wireless charging system to a power grid and improving reliability. The power factor correction circuit may further increase or reduce an output voltage of the power factor correction circuit based on a subsequent requirement. The inverter circuit may convert, into a high-frequency alternating current voltage, the voltage output by the power factor correction circuit, and apply the high-frequency alternating current voltage to the power transmit coil. The high-frequency alternating current voltage can greatly improve transmission efficiency and a power transmission distance of the power transmit coil 201.

It should be noted that the power supply 30 may be an external power supply of the power transmit device 20, or may be a power supply disposed inside the power transmit device 20. This is not limited in this embodiment of this application.

The transmission control module 203 is connected to the transmission conversion module 202, and is configured to control parameters such as a voltage, a current, and a frequency of the transmission conversion module 202 based on an actual transmit power requirement for wireless charging, to adjust a voltage or a current of the high-frequency alternating current in the power transmit coil 201.

The transmission communications module 204 is configured to perform wireless communication with a power receive device 10. Communication content may include power control information, fault protection information, power-on/off information, interactive authentication information, and the like. For example, the transmission communications module 204 may receive information such as attribute information, a charging request, and interactive authentication information that are of the to-be-charged device and that are sent by the power receive device 10. The transmission communications module 204 may further send information such as wireless charging transmission control information, interactive authentication information, and wireless charging historical data information to the power receive device 10.

Specifically, a manner of wireless communication between the transmission communications module 204 and the power receive device 10 may include any one of or any combination of Bluetooth, wireless fidelity (Wi-Fi), ZigBee, radio frequency identification (RFID), long-range (Lora) wireless, and near field communication (NFC). Optionally, the transmission communications module 204 may further communicate with an intelligent terminal of a user to which the to-be-charged device belongs, and the user to which the to-be-charged device belongs may implement remote authentication and user information transmission by using a communication function.

The authentication management module 205 may be configured to perform interactive authentication and permission management with the to-be-charged device.

The storage module 206 may be configured to store charging process data, interactive authentication data (for example, interactive authentication information), and permission management data (for example, permission management information) of the power transmit device 10. The interactive authentication data and the permission management data may be set from the factory or may be set by the user. This is not limited in this embodiment of this application.

Still referring to FIG. 2, the power receive device 10 may include a power receive coil 101, a receiving conversion module 102, a receiving control module 103, and a receiving communications module 104.

The power receive coil 101 is configured to receive active power and reactive power transmitted by the power transmit device 20. A coupling manner of the power transmit coil 201 and the power receive coil 101 in the wireless charging system may be any selective combination. For example, a coupling manner of the two coils may include: S-S coupling, P-P coupling, S-P coupling, P-S coupling, LCL-LCL coupling, LCL-P coupling, or the like. Herein, S represents in series, P represents in parallel, L represents an inductor, and C represents a capacitor. The S-S coupling means that a resonant circuit in the power transmit device 20 is series resonance, and a resonant circuit in the power receive device 10 is series resonance. The S-P coupling means that a resonant circuit in the power transmit device 20 is series resonance, and a resonant circuit in the power receive device 10 is parallel resonance. The LCL-LCL type means that a resonant circuit in each of the power transmit device 20 and the power receive device 10 is an LCL resonant circuit (that is, a resonant circuit including two inductors L and one capacitor C).

In addition, to implement a bidirectional charging function of the wireless charging system, each of the power transmit device 20 and the power receive device 10 may include both a power receive coil and a power transmit coil. The power transmit coil and the power receive coil in each device may be separately disposed, or may be disposed in an integrated manner.

The receiving conversion module 102 may be connected to an energy storage module 50 by using an energy storage management module 40. The receiving conversion module 102 is configured to convert a high-frequency resonant current (or a voltage) received by the power receive coil 101 into a direct current (or a direct current voltage) required by the energy storage module 50 for charging. The receiving conversion module 102 may include a rectifier circuit and a direct current conversion unit. The rectifier circuit may convert the high-frequency resonant current (or a voltage) received by the power receive coil 101 into a direct current (or a direct current voltage). The direct current conversion unit may provide the direct current (or the direct current voltage) for a subsequent charging circuit, to implement charging in a constant mode. The rectifier circuit may be integrated with the power receive coil 101, or may be disposed independently.

It should be noted that the energy storage management module 40 and the energy storage module 50 may be located outside the power receive device 10, for example, may be integrated into the power supply of the to-be-charged device. Alternatively, the energy storage management module 40 and the energy storage module 50 may be located inside the power receive device 10. Referring to FIG. 2, it may be learned that the energy storage module 50 may be further connected to a drive apparatus 60 and is configured to supply power to the drive apparatus 60, to drive the to-be-charged device.

The receiving control module 103 is configured to control parameters such as a voltage, a current, and a frequency of the receiving conversion module 102 based on an actual receive power requirement for wireless charging.

The receiving communications module 104 is configured to communicate with the transmission communications module 204 in the power transmit device 20. A function of the receiving communications module 104 corresponds to a function of the transmission communications module 204.

An embodiment of this application provides a wireless charging alignment apparatus. The apparatus may be applied to the wireless charging system shown in FIG. 1 or FIG. 2. The wireless charging alignment apparatus may be disposed in at least one of the power receive device 10 and the power transmit device 20. Alternatively, the wireless charging alignment apparatus may be the power receive device 10 or the power transmit device 20. For example, the wireless charging alignment apparatus may be the power receive device 10 disposed in the electric vehicle.

Figure 3:
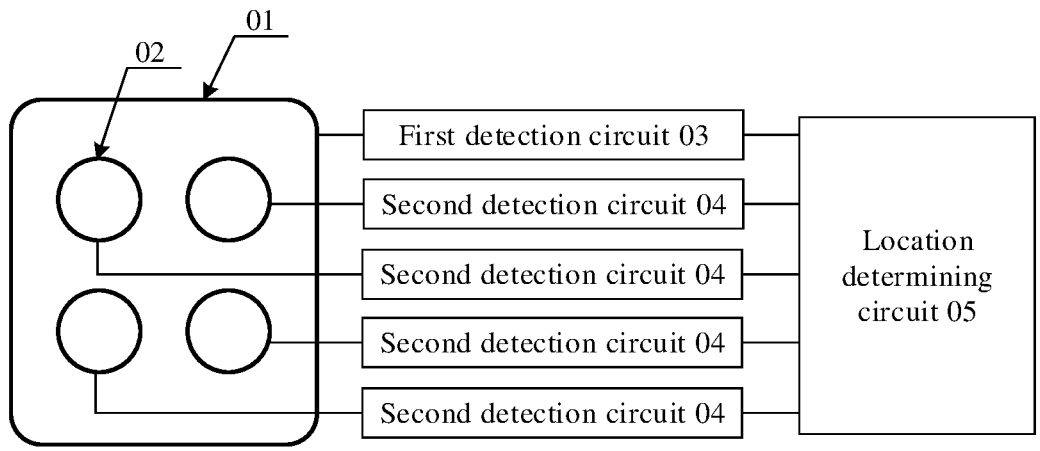
FIG. 3 is an example schematic structural diagram of a wireless charging alignment apparatus according to an embodiment of this application.

The following provides description by using an example in which the wireless charging alignment apparatus is disposed in the power receive device 10 and the power transmit coil is disposed in the power transmit device 20. Referring to FIG. 3, the wireless charging alignment apparatus may include a power receive coil 01, a location detection coil 02, a first detection circuit 03, a second detection circuit 04, and a location determining circuit 05.

The power receive coil 01 is configured to exchange power with the power transmit coil through electromagnetic mutual inductance.

The first detection circuit 03 may be configured to detect a first induction signal of the power receive coil 01 in a positioning magnetic field generated by the power transmit coil, and the second detection circuit 04 may be configured to detect a second induction signal of the location detection coil 02 in the positioning magnetic field. The power transmit coil may be a power induction coil specifically used for wireless charging in the power transmit device 20. Alternatively, the power transmit coil may be a coil specifically used to generate a magnetic field in the power transmit device 20, and may be disposed adjacent to the power induction coil specifically used for wireless charging.

The location determining circuit 05 is configured to determine a location of the power receive coil 01 relative to the power transmit coil based on the first induction signal and the second induction signal.

In this embodiment of this application, after the location determining circuit 05 determines the location of the power receive coil 01 relative to the power transmit coil, at least one of the power receive device 10 and the power transmit device 20 may adjust its location based on the location, so that the power receive coil 01 can be accurately aligned with the power transmit coil, to ensure wireless charging efficiency. For example, the power receive device 10 may adjust the location of the power receive device 10, so that the two coils are aligned.

Optionally, the location of the power receive coil 01 relative to the power transmit coil may be represented by using the following coordinates: coordinates of a central point of the power receive coil 01 in a coordinate system in which a central point of the power transmit coil is used as an origin; or coordinates of a central point of the power transmit coil in a coordinate system in which a central point of the power receive coil 01 is used as an origin. That the power receive coil 01 is aligned with the power transmit coil may indicate that a distance between the central points of the two coils is less than a distance threshold. The distance threshold may be configured before the delivery of the power receive device 10 or the power transmit device 20, or may be set by a user. This is not limited in this embodiment of this application.

For example, it is assumed that the wireless charging alignment apparatus is the power receive device 10 in the electric vehicle. In this case, after the location determining circuit 05 determines the location of the power receive coil 01 relative to the power transmit coil, the relative location may be displayed on an in-vehicle display device, so that a driver adjusts a location of the electric vehicle based on the relative location to align the power receive coil with the power transmit coil. Alternatively, the location determining circuit 05 may directly send the relative location to a controller of the electric vehicle, and the controller of the electric vehicle may automatically adjust a location of the electric vehicle based on the relative location to align the power receive coil with the power transmit coil.

In conclusion, this embodiment of this application provides the wireless charging alignment apparatus. The location determining circuit in the apparatus may determine the location of the power receive coil relative to the power transmit coil based on the induction signals detected by the detection circuit. In this way, at least one of the power receive device and the power transmit device can adjust its location based on the relative location, so that the two coils are aligned. In the related technology, a driver visually measures a relative location of the two coils. In comparison with the related technology, in this embodiment of this application, both precision and efficiency of determining the relative location based on the induction signals are higher. Therefore, alignment precision and alignment efficiency of the two coils can be effectively improved. In addition, because the apparatus can detect the second induction signal of the location detection coil by using the second detection circuit, and can also detect the first induction signal of the power receive coil by using the first detection circuit, precision of the relative location determined by the location determining circuit based on the two types of induction signals is higher, thereby effectively ensuring the alignment precision of the two coils.

In this embodiment of this application, if the wireless charging alignment apparatus is disposed in the power receive device 10 or is the power receive device 10, the first detection circuit 03, the second detection circuit 04, and the location determining circuit 05 may all be circuits in the receiving control module 103 in the power receive device 10. If the wireless charging alignment apparatus is disposed in the power transmit device 20 or is the power transmit device 20, the first detection circuit 03, the second detection circuit 04, and the location determining circuit 05 may all be circuits in the transmission control module 203 in the power transmit device 20.

Optionally, the wireless charging alignment apparatus may further include a magnetic core. Both the power receive coil 01 and the location detection coil 02 may be disposed on the magnetic core, and may be both located on one side of the magnetic core close to the power transmit coil 01. For example, if the wireless charging alignment apparatus is a power receive device disposed in an electric vehicle, and the power transmit device is disposed on the ground or buried under the ground, both the power receive coil 01 and the location detection coil 02 may be disposed on one side of the magnetic core close to the ground.

Because the magnetic core has a relatively high magnetic permeability and has a function of aggregating a magnetic field, it can be ensured that the induction signals generated by the power receive coil 01 and the location detection coil 02 in the positioning magnetic field have higher strength for detection of the induction signals.

Referring to FIG. 3, it may be further learned that, to ensure detection precision, the wireless charging alignment apparatus may include a plurality of location detection coils 02 and a plurality of second detection circuits 04 in a one-to-one correspondence with the plurality of location detection coils 02. Each second detection circuit 04 is connected to a corresponding location detection coil 02, and is configured to detect an induction signal of the location detection coil 02 that is connected to the second detection circuit 04 and that is in the positioning magnetic field generated by the power transmit coil.

In this embodiment of this application, a quantity of location detection coils 02 disposed in the wireless charging alignment apparatus may be greater than or equal to 3. For example, in the structure shown in FIG. 3, four location detection coils 02 are disposed in the wireless charging alignment apparatus.

Optionally, a size of each location detection coil 02 may be less than a size of the power receive coil 01. The plurality of location detection coils 02 may be evenly distributed, and may be all located in an area enclosed by the power receive coil 01 or located around the power receive coil 01. When the coil is circular, a size of the coil may indicate a radius or a diameter of the coil. When the coil is polygonal, a size of the coil may indicate a radius or a diameter of a minimum circumcircle of the coil.

In this embodiment of this application, the location determining circuit 05 or a memory connected to the location determining circuit 05 may store a correspondence between an offset location and each of the induction signal of the power receive coil 01 and the induction signal of the location detection coil 02. After obtaining the first induction signal and the second induction signal, the location determining circuit 05 may determine, as the location of the power receive coil 01 relative to the power transmit coil, an offset location corresponding to the first induction signal and the second induction signal in the correspondence.

The offset location may be represented by using the following coordinates: coordinates of a central point of the power receive coil 01 in a coordinate system in which a central point of the power transmit coil is used as an origin; or coordinates of a central point of the power transmit coil in a coordinate system in which a central point of the power receive coil 01 is used as an origin.

The relative location of the two coils is determined based on the correspondence, to effectively improve efficiency of determining the relative location, thereby further ensuring alignment efficiency of the two coils.

Optionally, a correspondence between an offset location and each of the induction signal of the power receive coil 01 and the induction signal of the location detection coil 02 may be obtained through a pre-experiment. The experiment process may be: controlling the power transmit coil driven by an alternating current with a constant root mean square, to generate the positioning magnetic field; then, gradually moving the power receive coil 01 and the location detection coil 02, or moving the power transmit coil, so that the relative location of the power receive coil 01 and the power transmit coil changes constantly, that is, the offset location of the power receive coil 01 and the power transmit coil changes constantly; and at each offset location, separately detecting the induction signal of the power receive coil 01 in the positioning magnetic field and the induction signal of the location detection coil 02 in the positioning magnetic field, to obtain the correspondence between the offset location and each of the induction signal of the power receive coil 01 and the induction signal of the location detection coil 02.

To ensure alignment precision, in the process of moving the coils, the offset location of the power receive coil 01 and the location detection coil 02 may be enabled to cover location points in an effective detection range as many as possible, so that induction signals of the power receive coil 01 and the location detection coil 02 at the location points can be obtained. The effective detection range may be a range in which at least one of the power receive coil 01 and the location detection coil 02 can sense the positioning magnetic field generated by the power transmit coil.

Figure 4:
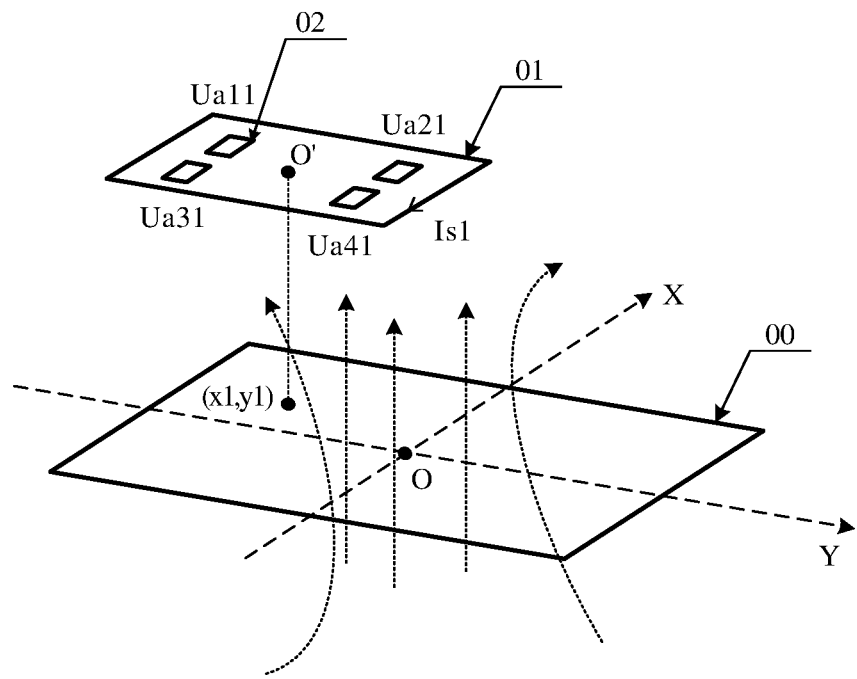
FIG. 4 is an example schematic diagram of a location of a power receive coil relative to a power transmit coil according to an embodiment of this application.

Referring to FIG. 4, it is assumed that the wireless charging alignment apparatus includes four location detection coils 02 in total: a location detection coil 1 to a location detection coil 4, and coordinates of an offset location are coordinates of a central point O' of a power receive coil 01 in a coordinate system in which a central point O of a power transmit coil 00 is used as an origin. In addition, to simplify calculation, the coordinates may be simplified as two-dimensional coordinates that are of orthographic projection of the central point O' in a plane in which the power transmit coil 00 is located and that are in a two-dimensional coordinate system (for example, an XOY coordinate system shown in FIG. 4) of the plane.

In an experiment process, the power receive coil 01 and the four location detection coils 02 may be controlled to be gradually moved. If the coordinates that are of the orthographic projection of the central point O' of the power receive coil 01 and that are in the XOY coordinate system are (x1, y1), a signal value (for example, a current value of an inductance current) of a detected induction signal of the power receive coil 01 in a positioning magnetic field is Is1, and signal values (for example, voltage values of open-circuit voltages) of induction signals of the four location detection coils 02 in the positioning magnetic field are respectively Ua11, Ua21, Ua31, and Ua41. In this case, it may be determined that the signal value of the induction signal that is of the power receive coil and that corresponds to the offset location (x1, y1) is Is1, and the signal values of the induction signals that are of the location detection coils and that corresponds to the offset location (x1, y1) are Ua11, Ua21, Ua31, and Ua41.

Based on the foregoing method, the power receive coil 01 and the four location detection coils 02 are moved. In this way, after the central point O' of the power receive coil 01 traverses coordinate points in an effective detection range in the XOY coordinate system, a correspondence between the offset location and each of the induction signal of the power receive coil 01 and the induction signal of the location detection coil 02 may be obtained.

The coordinate points in the effective detection range may be all coordinate points determined within the effective detection range in the XOY coordinate system by using a first length as a unit length of the x-axis and using a second length as a unit length of the y-axis. The first length and the second length may be equal or unequal, and may be set according to a requirement for alignment precision. For example, when a relatively high requirement is imposed on the alignment precision, the first length and the second length may be set to be relatively short; or when a relatively low requirement is imposed on the alignment precision, the first length and the second length may be set to be relatively long.

Optionally, in the correspondence obtained based on the foregoing experiment data, a plurality of signal groups and an offset location corresponding to each signal group may be recorded. Each signal group may include a signal value of an induction signal of the power receive coil 01 and a signal value of an induction signal of the location detection coil 02.

For example, the finally obtained correspondence may be shown in Table 1. Table 1 shows n (n is an integer greater than 1) signal groups and an offset location corresponding to each signal group. Each signal group includes a signal value of an induction signal of the power receive coil 01 and signal values of induction signals of the location detection coils 02. It is assumed that a signal value that is of a first induction signal and that is obtained by a location determining circuit 05 in an actual alignment process is Is2, and signal values that are of second induction signals and that are obtained by the location determining circuit 05 in the actual alignment process are respectively Ua12, Ua22, Ua32, and Ua42. In this case, according to the correspondence shown in Table 1, the location determining circuit 05 may determine that a current location of the power receive coil 01 relative to the power transmit coil is (x2, y2).

TABLE 1

| Offset location | | Signal group | | | | |
|---|---|---|---|---|---|---|
| | | Signal value of an induction signal of a | Signal value of an induction signal of a | Signal value of an induction signal of a | Signal value of an induction signal of a | Signal value of an induction signal of a |
| Coordinate on the x-axis | Coordinate on the y-axis | location detection coil 1 | location detection coil 2 | location detection coil 3 | location detection coil 4 | power receive coil |
| x1 | y1 | Ua11 | Ua21 | Ua31 | Ua41 | Is1 |
| x2 | y2 | Ua12 | Ua22 | Ua32 | Ua42 | Is2 |
| x3 | y3 | Ua13 | Ua23 | Ua33 | Ua43 | Is3 |
| x4 | y4 | Ua14 | Ua24 | Ua34 | Ua44 | Is4 |
| x5 | y5 | Ua15 | Ua25 | Ua35 | Ua45 | Is5 |
| ... | ... | ... | ... | ... | ... | ... |
| xn | yn | Ua1n | Ua2n | Ua3n | Ua4n | Isn |

In this embodiment of this application, the correspondence between the offset location and each of the induction signal of the power receive coil 01 and the induction signal of the location detection coil 02 may be recorded in a form of a table such as Table 1, or may be recorded in a form of a function. In other words, function fitting may be performed on the offset location obtained from the experiment, the induction signal of the location detection coil 02 at the offset location, and the induction signal of the power receive coil 01 at the offset location, to obtain a function of a relationship between the offset location and each of the induction signal of the location detection coil 02 and the induction signal of the power receive coil 01: $(x, y) = f(d, b)$. Herein, $(x, y)$ represents the offset location, d represents the signal value of the induction signal of the location detection coil 02, and b represents the signal value of the induction signal of the power receive coil 01. After obtaining the first induction signal and the second induction signals, the location determining circuit 05 may apply the signal values of the obtained induction signals to the relationship function, to obtain the location of the power receive coil 01 relative to the power transmit coil.

It should be noted that when the correspondence is recorded in a form of a table such as Table 1, the signal value of the first induction signal and the signal values of the second induction signals that are obtained by the location determining circuit 05 may be different from those of each signal group recorded in the table. In this case, the location determining circuit 05 may determine an offset location corresponding to a signal group with a smallest difference as the location of the power receive coil 01 relative to the power transmit coil.

In other words, the location determining circuit 05 may be configured to determine a first difference between the signal value of the first induction signal and the signal value of the induction signal of the power receive coil 01 in each signal group, and a second difference between the signal value of the second induction signal and the signal value of the induction signal of the location detection coil 02 in each signal group, to obtain the first difference and the second difference of each signal group. Then, an offset location corresponding to a signal group whose sum of the first difference and the second difference is the smallest in the plurality of signal groups may be determined as the offset location corresponding to the first induction signal and the second induction signal. Each of the first difference and the second difference may be an absolute value.

It is assumed that the signal value that is of the first induction signal and that is obtained by the location determining circuit 05 is Isk, and the signal values that are of the second induction signals and that are obtained by the location determining circuit 05 are respectively Ua1k, Ua2k, Ua3k, and Ua4k. In this case, the location determining circuit 05 may separately determine a first difference between Isk and the signal value of the induction signal of the power receive coil 01 in each signal group, and each second difference between each of the signal values of the induction signals of the location detection coils 02 in each signal group and each of Ua1k, Ua2k, Ua3k, and Ua4k, to obtain the first difference and the second differences of each signal group. It is assumed that a sum of the first difference and the second differences of an nth signal group: Isn, Ua1n, Ua2n, Ua3n, and Ua4n is the smallest in the signal groups shown in Table 1. The sum $\Delta U$ of the first difference and the second differences may be represented as: $\Delta U = |Isk - Isn| + |Ua1k - Ua1n| + |Ua2k - Ua2n| + |Ua3k - Ua3n| + |Ua4k - Ua4n|$.

In this case, the location determining circuit 05 may determine that the current location of the power receive coil 01 relative to the power transmit coil is an offset location (xn, yn) corresponding to the nth signal group.

For example, referring to Table 2, it is assumed that five offset locations: (x1, y1) to (x5, y5) and a signal group corresponding to each offset location are recorded in a correspondence stored in the location determining circuit 05; and a signal value that is of a first induction signal and that is currently obtained by the location determining circuit 05 through measurement performed by two detection circuits in real time is 43, and signal values that are of second induction signals and that are currently obtained by the location determining circuit 05 through measurement performed by the two detection circuits in real time are respectively 410, 432, 412, and 1345. In this case, according to the foregoing method, the location determining circuit 05 may separately calculate a first difference between the signal value of the first induction signal and the signal value of the induction signal of the power receive coil in each signal group in Table 2, and each second difference between each of the signal values of the second induction signals and each of the signal values of the induction signals of the location detection coils in each signal group, to obtain each sum of each first difference and each group of second differences of each of the five signal groups: 88, 36, 55, 131, and 208. Because a sum: 36 of the first difference between the signal value of the first induction signal and a signal value of an induction signal in a second signal group, and each second difference between each of the signal values of the second induction signals and each of signal values of induction signals in a second signal group is the smallest, an offset location (x2, y2) corresponding to the second signal group may be determined as the location of the power receive coil 01 relative to the power transmit coil.

power transmit coil may be obtained through detection performed by the detection circuit and be sent to the wireless charging alignment apparatus. Alternatively, in the alignment process, the root mean square of the alternating current in the power transmit coil is the same as the root mean square of the alternating current in the experiment process.

TABLE 2

| Offset location | | Signal group | | | | | |
|---|---|---|---|---|---|---|---|
| Coordinate on the x-axis | Coordinate on the y-axis | Signal value of an induction signal of a location detection coil 1 | Signal value of an induction signal of a location detection coil 2 | Signal value of an induction signal of a location detection coil 3 | Signal value of an induction signal of a location detection coil 4 | Signal value of an induction signal of a power receive coil | Sum of a first difference and second differences |
| x1 | y1 | 379 | 420 | 399 | 1372 | 38 | 88 |
| x2 | y2 | 402 | 441 | 408 | 1357 | 46 | 36 |
| x3 | y3 | 423 | 461 | 414 | 1335 | 44 | 55 |
| x4 | y4 | 444 | 479 | 416 | 1303 | 47 | 131 |
| x5 | y5 | 468 | 500 | 417 | 1276 | 51 | 208 |
| Detected induction signal | | 410 | 432 | 412 | 1345 | 43 | \ |

In this embodiment of this application, the signal value of the induction signal of the location detection coil 02 shown in Table 2 may be a value obtained after sampling processing is performed on a voltage of the location detection coil 02, and the signal value of the induction signal of the power receive coil 01 may be a value obtained after sampling processing is performed on a current of the power receive coil 01.

In a scenario in which the four location detection coils 02 are disposed in the wireless charging alignment apparatus, based on an experiment result, it is indicated that an error in determining the relative location based on only the second induction signals of the four location detection coils is 63.6% greater than an error in determining the relative location based on both the first induction signal and the second induction signals. It can be learned that the alignment method provided in this embodiment of this application can be used to effectively improve alignment precision.

It should be further noted that, in an experiment process of obtaining the correspondence and in an actual alignment process, the positioning magnetic field generated by the power transmit coil is generated and driven by an alternating current with a constant root mean square. In other words, in the experiment process and in the actual alignment process, the root mean square of the alternating current in the power transmit coil is fixed.

Optionally, in this embodiment of this application, after obtaining the first induction signal and the second induction signal, the location determining circuit 05 may further determine a coupling coefficient between the power receive coil 01 and the power transmit coil based on the first induction signal and a current or a voltage of the power transmit coil. Then, the location determining circuit 05 determines the location of the power receive coil 01 relative to the power transmit coil based on the coupling coefficient and the second induction signal.

The coupling coefficient may be a coefficient used to reflect a coupling degree between the power receive coil 01 and the power transmit coil. The current or the voltage of the power transmit coil may also be a fixed value pre-stored in the location determining circuit 05.

For example, when the first induction signal is a short-circuit current, the coupling coefficient k determined based on the current of the power transmit coil may meet the following:

$$k = \sqrt{\frac{L_1}{L_2}} \cdot \frac{I_1}{I_2}$$

Herein, $L_1$ is an inductance value of the power receive coil 01, $L_2$ is an inductance value of the power transmit coil, $I_1$ is a short-circuit current value of the power receive coil 01, and $I_2$ is a current value of the power transmit coil.

When the first induction signal is an open-circuit voltage, the coupling coefficient k determined based on the current of the power transmit coil may meet the following:

$$k = \frac{1}{j\omega\sqrt{L_1 L_2}} \cdot \frac{U_S}{I_2}$$

Herein, j is an imaginary unit, ω is an operating frequency of the wireless charging system (that is, a frequency of an alternating current in the power transmit coil 201), and Us is an open-circuit voltage value of the power receive coil 01.

When the first induction signal is an open-circuit voltage, the coupling coefficient k determined based on the voltage of the power transmit coil may further meet the following:

$$k = \sqrt{\frac{L_2}{L_1}} \cdot \frac{U_S}{U_P}$$

Herein, Up is a voltage value of the power transmit coil.

When determining the location of the power receive coil 01 relative to the power transmit coil based on the coupling coefficient and the second induction signal, the location determining circuit 05 may alternatively determine the location of the power receive coil 01 relative to the power transmit coil based on a correspondence that is between the offset location and each of the induction signal of the location detection coil and the coupling coefficient and that is generated in the pre-experiment. For a process of generating the correspondence between the offset location and each of the coupling coefficient and the induction signal of the location detection coil, refer to the foregoing description.

In this embodiment of this application, the first induction signal and the second induction signal may be different physical quantities or an amplitude difference between signal values of the first induction signal and the second induction signal is relatively large. For example, the first induction signal is a current, and the second induction signal is a voltage. To improve processing efficiency and location determining precision, after obtaining the first induction signal and the second induction signal, the location determining circuit 05 may further separately preprocess the first induction signal and the second induction signal, so that amplitudes of the signal value of the preprocessed first induction signal and the signal value of the second induction signal are similar. Then, the location determining circuit 05 determines the location of the power receive coil 01 relative to the power transmit coil based on the preprocessed first induction signal and the preprocessed second induction signal.

The preprocessing may include at least one of normalization processing and weighting processing. The normalization processing on an induction signal may means to normalize a signal value of the induction signal to a value between 0 and 1. The weighting processing on an induction signal may means to multiply a weighting factor and a signal value of the induction signal.

For example, it is assumed that when the central point O' of the power receive coil 01 is at an $i^{th}$ coordinate point in the coordinate system in which the central point O of the power transmit coil 00 is used as an origin, the signal value of the first induction signal obtained by the location determining circuit 05 is $d_{1i}$. In this case, a signal value $d_{1i}'$ obtained after the location determining circuit 05 performs normalization processing on the signal value $d_{1i}$ of the first induction signal may be represented as follows:

$$d_{1i}' = \frac{d_{1i} - \min(D_1)}{\max(D_1) - \min(D_1)}$$

Herein, $D_1$ represents a set of signal values that are of the first induction signals and that are obtained by the location determining circuit 05 when the central point O' of the power receive coil 01 is at different coordinate points, $\max(D_1)$ represents a maximum value in the set D1, and $\min(D_1)$ represents a minimum value in the set D1. When the signal values of all the first induction signals in the set $D_1$ are equal, $\max(D_1)$ may be equal to the signal value of the first induction signal, and $\min(D_1)$ may be 0.

Similarly, it is assumed that when the wireless charging alignment apparatus includes M location detection coils 02, and when the central point O' of the power receive coil 01 is at an $i^{th}$ coordinate point in the coordinate system in which the central point O of the power transmit coil 00 is used as an origin, a signal value that is of a second induction signal of an $m^{th}$ location detection coil 02 and that is obtained by the location determining circuit 05 is $b_{mi}$. In this case, a signal value $b_{mi}'$ obtained after the location determining circuit 05 performs normalization processing on the signal value $b_{mi}$ of the second induction signal may be represented as follows:

$$b_{mi}' = \frac{b_{mi} - \min(B_m)}{\max(B_m) - \min(B_m)}$$

Herein, M is an integer greater than 1, m is a positive integer not greater than M, and $B_m$ represents a set of signal values that are of the second induction signals of the $m^{th}$ location detection coil 02 and that are obtained by the location determining circuit 05 when the central point O' of the power receive coil is at different coordinate points.

In this embodiment of this application, signal values of induction signals in the set $D_1$ and the set $B_m$ may be obtained during generating the correspondence between the offset location and each of the induction signal of the power receive coil 01 and the induction signal of the location detection coil 02. In other words, the signal values of the induction signals in the set $D_1$ and the set $B_m$ may be obtained by traversing the central point O' of the power receive coil 01 at each coordinate point within the effective detection range and detecting the induction signal at each coordinate point.

Optionally, the location determining circuit 05 may further prestore a weighting factor of an induction signal of the power receive coil 01 and a weighting factor of an induction signal of each location detection coil 02. The weighting factor of each induction signal may be determined based on an experiment (that is, the foregoing experiment used to generate a correspondence). After obtaining the first induction signal and the second induction signal, the location determining circuit 05 may multiply a signal value of each induction signal and a weighting factor corresponding to the induction signal, so that amplitudes of signal values of induction signals are relatively close.

It is assumed that a weighting factor of an induction signal of the power receive coil 01 is $\alpha_1$, and a weighting factor of an induction signal of the $m^{th}$ location detection coil 02 in the M location detection coils is In this case, a signal value $d_{1i}''$ obtained after the location determining circuit 05 performs weighting processing on a signal value $d_{1i}$ of the first induction signal may be represented as $d_{1i}''=\alpha_1 \cdot d_{1i}$; and a signal value $b_{1i}''$ obtained after the location determining circuit 05 performs weighting processing on a signal value $b_{mi}$ of the second induction signal of the $m^{th}$ location detection coil 02 may be represented as $b_{1i}''=\beta_m \cdot b_{mi}$.

It should be noted that in this embodiment of this application, the location determining circuit 05 may perform only normalization processing or weighting processing on each induction signal, or the location determining circuit 05 may perform both normalization processing and weighting processing on each induction signal, where a sequence of performing the normalization processing and the weighting processing may be adjusted.

It should be further noted that, if each induction signal is an induction signal before being preprocessed in the correspondence between the offset location and each of the induction signal of the power receive coil 01 and the induction signal of the location detection coil 02 that are obtained by the location determining circuit 05, the location determining circuit 05 does not need to preprocess the first induction signal and the second induction signal when determining the offset location based on the first induction signal and the second induction signal. If each induction signal is the preprocessed induction signal in the correspondence between the offset location and each of the induction signal of the power receive coil 01 and the induction signal of the location detection coil 02 that are obtained by the location determining circuit 05, the location determining circuit 05 needs to preprocess the first induction signal and the second induction signal when determining the offset location based on the first induction signal and the second induction signal. In addition, the preprocessing manner needs to be the same as the preprocessing manner for the induction signal recorded in the correspondence, to ensure detection accuracy.

For example, it is assumed that the preprocessing is weighting processing, a weighting factor of the induction signal of the power receive coil 01 is 15, and a weighting factor of the induction signal of each location detection coil 02 is 1. In this case, a signal value of an induction signal obtained after the weighting processing is performed on a signal value of an induction signal obtained through real-time measurement in each signal group shown in Table 2 may be shown in Table 3. Referring to Table 3, it may be learned that the signal value of the preprocessed first induction signal is 645, and the signal values of the second induction signals are the same as those before the preprocessing and are respectively 410, 432, 412, and 1345. Each sum of each first difference between the signal value of the preprocessed first induction signal and the signal value of the induction signal in each signal group, and each second difference between each of the signal values of the second induction signals and each of the signal values of the induction signals in each signal group is 158, 78, 69, 187, or 320.

Because a sum: 69 of a first difference between the signal value of the preprocessed first induction signal and a signal value of an induction signal in a third signal group, and each second difference between each of the signal values of the second induction signals and each of signal values of induction signals in the third signal group is the smallest, an offset location (x3, y3) corresponding to the third signal group may be determined as the location of the power receive coil 01 relative to the power transmit coil.

of the location detection coil 02 may include at least one of a current and a voltage. In addition, a type of the first induction signal is the same as a type of the induction signal of the power receive coil 01, and a type of the second induction signal is the same as a type of the induction signal of the location detection coil 02.

Optionally, the first detection circuit 03 may include a current detection circuit. Correspondingly, the first induction signal may include a current. For example, the current may be an alternating current, and the current detection circuit may be a circuit configured to detect the alternating current. The current detection circuit may include components such as a current transformer, an amplifier, and an analog-to-digital converter.

Figure 5:
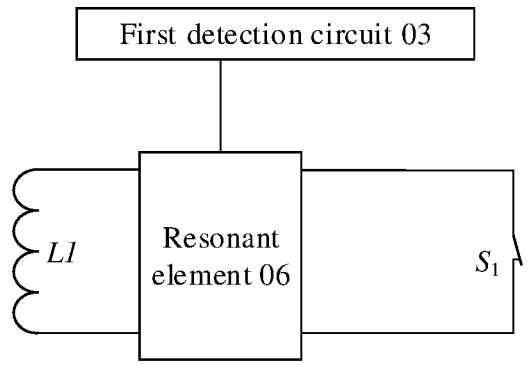
FIG. 5 is an example partial circuit diagram of a wireless charging alignment apparatus according to an embodiment of this application.

FIG. 5 is a circuit diagram of a wireless charging alignment apparatus according to an embodiment of this application. Referring to FIG. 5, the apparatus may further include a resonant element 06 and a first switch $S_1$. In the circuit diagram, a power receive coil 01 may be equivalent to an inductor L1. The inductor L1 is connected to the resonant element 06 to form a resonant circuit, and the first switch $S_1$ is connected in parallel to the resonant circuit. When the first switch $S_1$ is closed, the first detection circuit 03 may detect a current flowing through the resonant circuit. In other words, after the resonant circuit is short-circuited, the first detection circuit 03 may detect the current flowing through the resonant circuit.

Figure 6:
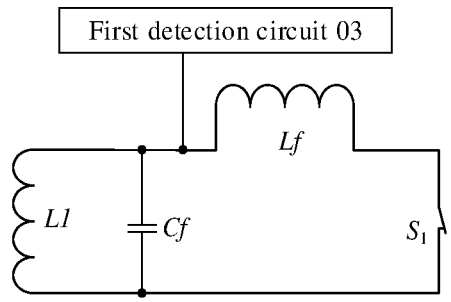
FIG. 6 is an example partial circuit diagram of another wireless charging alignment apparatus according to an embodiment of this application.
Figure 7:
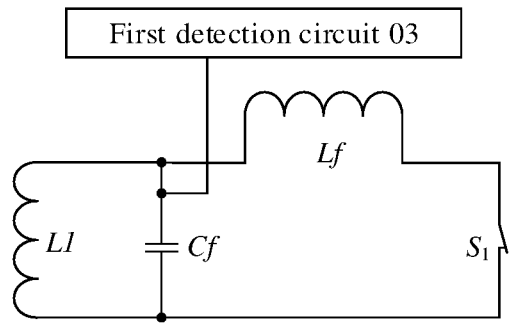
FIG. 7 is an example partial circuit diagram of still another wireless charging alignment apparatus according to an embodiment of this application.

Referring to FIG. 6 and FIG. 7, it may be learned that the resonant element 06 may include an inductor Lf connected in series to a power receive coil 01 (that is, an inductor L1 shown in FIG. 6 and FIG. 7), and a capacitor Cf connected in parallel to the power receive coil 01.

Optionally, as shown in FIG. 6, the first detection circuit 03 may be connected to the inductor Lf. Correspondingly, the current detected by the first detection circuit 03 is an inductance current flowing through the inductor Lf.

Alternatively, as shown in FIG. 7, the first detection circuit 03 may be connected to the capacitor Cf. Correspondingly, the current detected by the first detection circuit 03 is a capacitor current flowing through the capacitor Cf.

Figure 8:
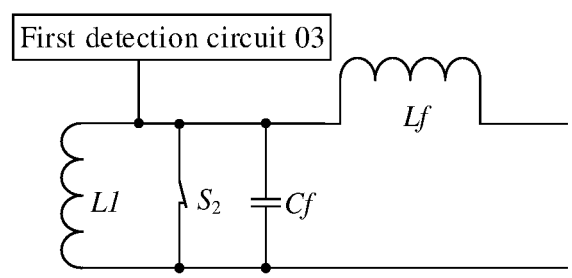
FIG. 8 is an example partial circuit diagram of further another wireless charging alignment apparatus according to an embodiment of this application.

Optionally, referring to FIG. 8, the apparatus may further include a second switch $S_2$. The second switch $S_2$ is connected in parallel to the power receive coil 01 (that is, an

TABLE 3

| Offset location | | Signal group | | | | | |
|---|---|---|---|---|---|---|---|
| Coordinate on the x-axis | Coordinate on the y-axis | Signal value of an induction signal of a location detection coil 1 | Signal value of an induction signal of a location detection coil 2 | Signal value of an induction signal of a location detection coil 3 | Signal value of an induction signal of a location detection coil 4 | Signal value of an induction signal of a power receive coil | Sum of a first difference and second differences |
| x1 | y1 | 379 | 420 | 399 | 1372 | 570 | 158 |
| x2 | y2 | 402 | 441 | 408 | 1357 | 690 | 78 |
| x3 | y3 | 423 | 461 | 414 | 1335 | 660 | 69 |
| x4 | y4 | 444 | 479 | 416 | 1303 | 705 | 187 |
| x5 | y5 | 468 | 500 | 417 | 1276 | 765 | 320 |
| Measured induction signal | | 410 | 432 | 412 | 1345 | 645 | \ |

In this embodiment of this application, each of the first induction signal, the second induction signal, the induction signal of the power receive coil 01, and the induction signal inductor L1 shown in FIG. 8). The first detection circuit 03 is connected to the power receive coil 01. When the second switch $S_2$ is closed, that is, after the power receive coil 01 is short-circuited, the first detection circuit 03 may detect a short-circuit current flowing through the power receive coil 01. Correspondingly, the current detected by the first detection circuit 03 is the short-circuit current flowing through the power receive coil 01.

Alternatively, the first detection circuit 03 may include at least two current detection circuits, and the at least two current detection circuits may be separately connected to at least two of the inductor Lf, the capacitor Cf, and the power receive coil 01. Correspondingly, the current detected by the first detection circuit 03 may include at least two of an inductance current, a capacitor current, and a short-circuit current.

Because the inductance current, the capacitor current, and the short-circuit current are relatively easy to detect, and detection precision is relatively high, the at least one of the detected inductance current, the detected capacitor current, and the detected short-circuit current is used as the first induction signal, thereby ensuring precision of the obtained first induction signal.

In this embodiment of this application, the first detection circuit 03 may further include a voltage detection circuit. Correspondingly, the first induction signal may include a voltage. For example, the voltage may be an alternating current voltage, and the first detection circuit 03 may be a voltage detection circuit configured to detect the alternating current voltage. The first detection circuit 03 may include components such as a rectifier circuit, an amplifier, and an analog-to-digital converter.

Figure 9:
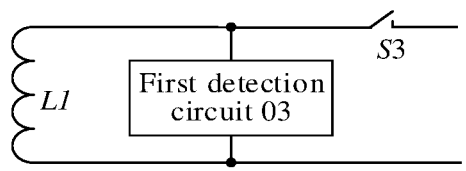
FIG. 9 is an example partial circuit diagram of further another wireless charging alignment apparatus according to an embodiment of this application.

As shown in FIG. 9, the apparatus may further include a third switch $S_3$. The third switch $S_3$ may be connected between the power receive coil 01 (that is, an inductor L1 shown in FIG. 9) and a subsequent circuit (not shown in FIG. 9) of the power receive coil 01. The subsequent circuit may include a circuit such as a receiving conversion module 102 in a power receive device 10.

The first detection circuit 03 may be connected in parallel to the power receive coil 01, and is configured to: when the third switch $S_3$ is opened, detect an open-circuit voltage between two ends of the power receive coil 01.

Optionally, the first detection circuit 03 may include both a current detection circuit and a voltage detection circuit. Correspondingly, the first induction signal detected by the first detection circuit 03 may include both a current and a voltage. For example, the first induction signal may include a short-circuit current of the power receive coil 01 and an open-circuit voltage between the two ends of the power receive coil 01.

If the first detection circuit 03 detects only one type of signal (for example, one of a capacitor current, an inductance current, a short-circuit current, and an open-circuit voltage), detection costs can be reduced. If the first detection circuit 03 can detect a plurality of types of signals (for example, at least two of a capacitor current, an inductance current, a short-circuit current, and an open-circuit voltage), reliability of the detected first induction signal can be ensured.

In this embodiment of this application, the second detection circuit 04 may include at least one of a voltage detection circuit and a current detection circuit. Correspondingly, the second induction signal may include at least one of a voltage and a current. The voltage may include at least one of a resonant voltage and an open-circuit voltage. The current may include at least one of a resonant current and a short-circuit current.

Optionally, the location detection coil 02 may be alternatively connected to a resonant element to form a resonant circuit. In this case, the resonant voltage may indicate a voltage of the resonant circuit. The open-circuit voltage may be a voltage between two ends of the location detection coil 02 when the location detection coil 02 is disconnected from the resonant element. The resonant current may be a current flowing through the resonant circuit. The short-circuit current may be a current flowing through the location detection coil 02 after the location detection coil 02 is short-circuited.

For example, the second detection circuit 04 may include a voltage detection circuit configured to detect an alternating current voltage, and the second detection circuit 04 may include components such as a rectifier circuit, an amplifier, and an analog-to-digital converter.

Figure 10:
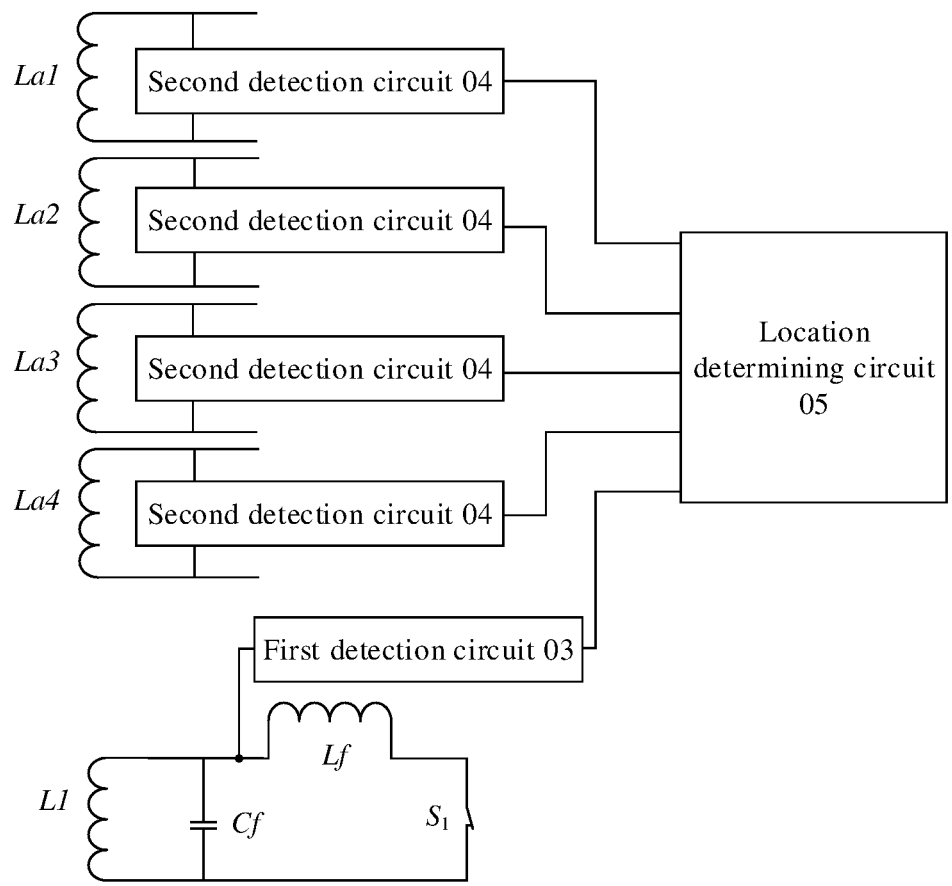
FIG. 10 is an example circuit diagram of a wireless charging alignment apparatus according to an embodiment of this application.
Figure 11:
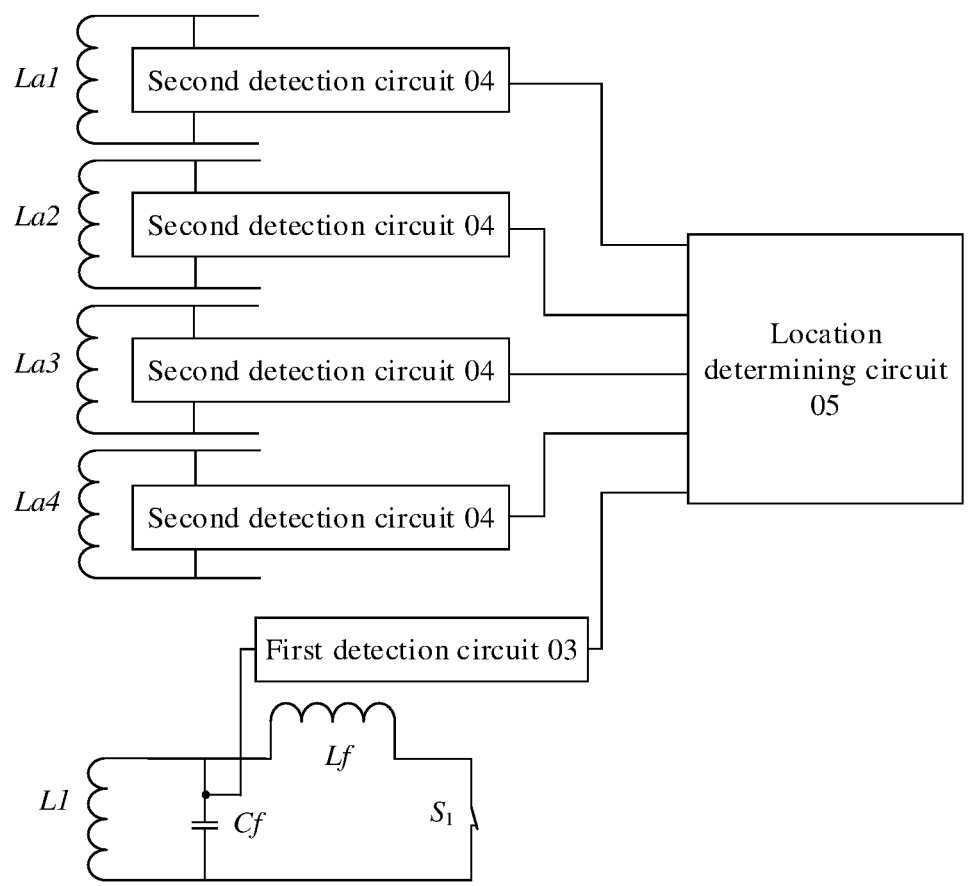
FIG. 11 is an example circuit diagram of another wireless charging alignment apparatus according to an embodiment of this application.
Figure 12:
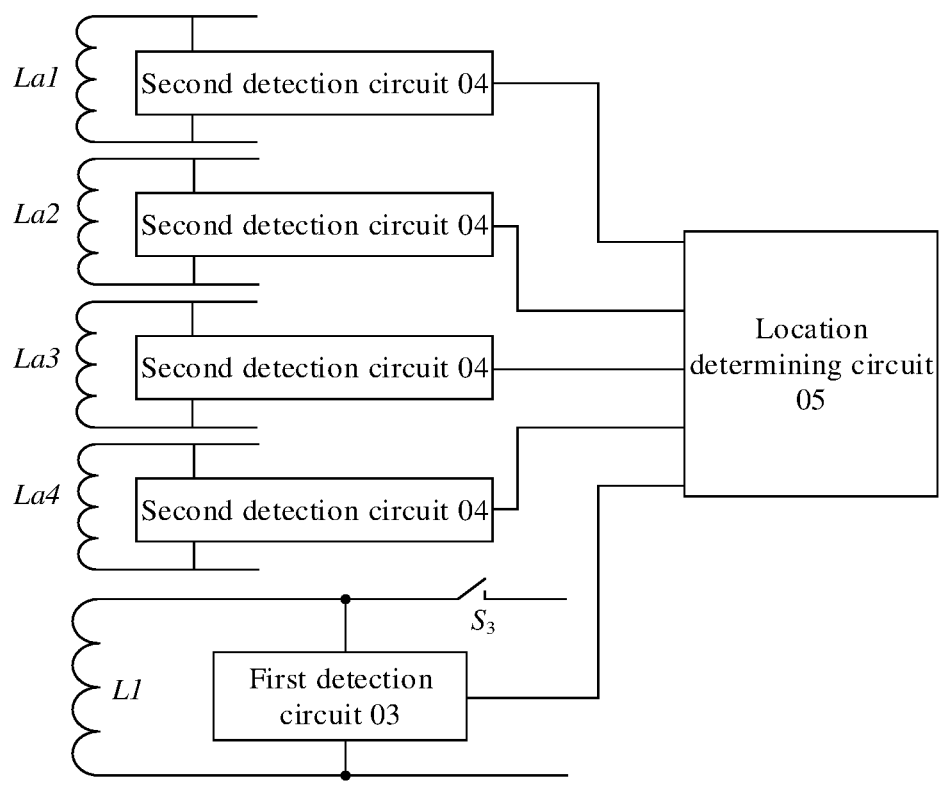
FIG. 12 is an example circuit diagram of still another wireless charging alignment apparatus according to an embodiment of this application.

Referring to FIG. 10 to FIG. 12, four location detection coils 02 may be disposed in a wireless charging alignment apparatus. The four location detection coils 02 may be respectively equivalent to an inductor La1, an inductor La2, an inductor La3, and an inductor La4 in a circuit. Correspondingly, four second detection circuits 04 are disposed in the wireless charging alignment apparatus. Each second detection circuit 04 may be connected in parallel to one inductor, and be configured to: detect a voltage of the inductor connected to the second detection circuit 04, and send the voltage to a location determining circuit 05.

It should be noted that a switch status of each of the first switch $S_1$, the second switch $S_2$, and the third switch $S_3$ may be controlled by the location determining circuit 05; or may be controlled by a switch control circuit independent of the location determining circuit 05 in the wireless charging alignment apparatus.

It should be further noted that if the wireless charging alignment apparatus is disposed in a power receive device 10 or is a power receive device 10, resonant elements such as the inductor Lf and the capacitor Cf may be elements in a receiving conversion module 102 in the power receive device 10. If the wireless charging alignment apparatus is disposed in a power transmit device 20 or is a power transmit device 20, resonant elements such as the inductor Lf and the capacitor Cf may be elements in a transmission conversion module 202 in the power transmit device 20.

It should be further noted that the wireless charging alignment apparatus may be applied to a receive end (e.g., a power receive device) in a wireless charging system, or may be applied to a transmit end (e.g., a power transmit device) in a wireless charging system. In addition, in the wireless charging system, the transmit end and the receive end may be interchanged. In other words, the receive end may also charge the transmit end. When the wireless charging alignment apparatus is applied to the transmit end, or when the transmit end and the receive end are interchanged, the power receive coil described above may also be referred to as a power transmit coil, and the power transmit coil may also be referred to as a power receive coil.

In conclusion, the embodiments of this application provide the wireless charging alignment apparatus. The location determining circuit in the apparatus may determine the relative location of the two coils based on the induction signals detected by the detection circuit. In this way, at least one of the power receive device and the power transmit device can adjust its location based on the relative location, so that the two coils are aligned. In the related technology, a driver visually measures a relative location of the two coils. In comparison with the related technology, in this embodiment of this application, both precision and efficiency of determining the relative location based on the induction signals are higher. Therefore, alignment precision and alignment efficiency of the two coils can be effectively improved.

In addition, the apparatus can detect the second induction signal of the location detection coil by using the second detection circuit, and can also detect the first induction signal of the power receive coil by using the first detection circuit. A size and a coverage area of the power receive coil are both larger than those of the location detection coil. The power receive coil has a relatively large difference from the location detection coil in terms of features. Therefore, precision of the relative location determined by the location determining circuit based on the two types of induction signals is higher, thereby effectively ensuring the alignment precision of the two coils. In addition, because the power receive coil is an original coil in the wireless charging alignment apparatus, by using the power receive coil for alignment, hardware usage of the wireless charging alignment apparatus can be effectively improved, thereby ensuring alignment precision and further avoiding increase of costs and a volume of the wireless charging alignment apparatus.

Figure 13:
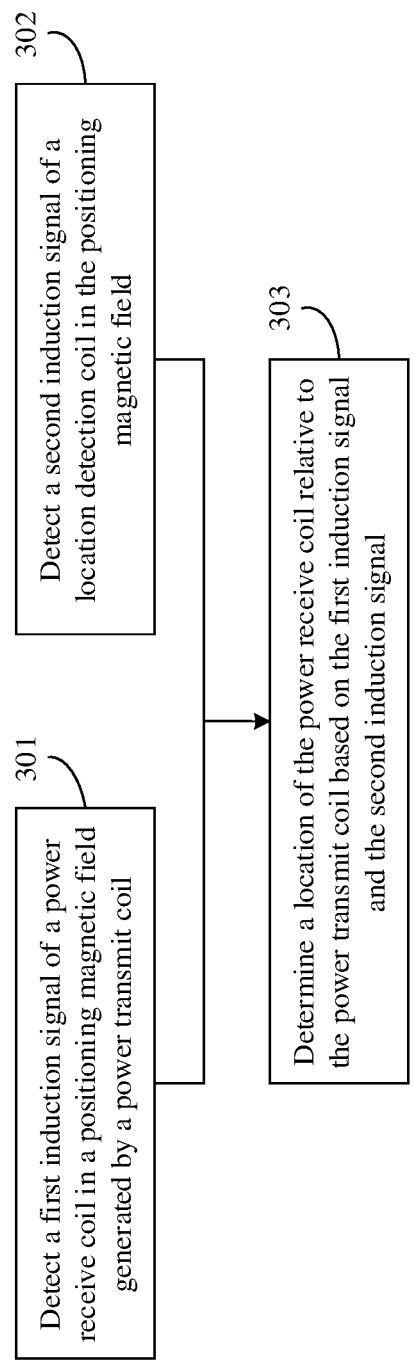
FIG. 13 is an example flowchart of a wireless charging alignment method according to an embodiment of this application.

An embodiment of this application further provides a wireless charging alignment method. The method may be applied to the wireless charging alignment apparatus provided in the foregoing embodiments. Referring to FIG. 13, the method may include the following steps:

Step 301: Detect a first induction signal of a power receive coil in a positioning magnetic field generated by a power transmit coil.

The power receive coil is configured to exchange power with the transmit coil of a transmit end through electromagnetic mutual inductance.

For example, it is assumed that a to-be-charged device is an electric vehicle, a power receive coil 01 is disposed in the electric vehicle, and a power transmit coil is disposed in a wireless charging station. In this case, when the electric vehicle needs to be wirelessly charged, a central controller of the electric vehicle may deliver a charging instruction to a receiving control module 103 in a power receive device 10. Because the power transmit coil needs to be first aligned with the power receive coil before the charging is started in a wireless charging system, the wireless charging system first enters an alignment state. In this case, the receiving control module 103 may send, by using a receiving communications module 104, a positioning instruction to a transmission communications module 204 in a power transmit device 20 located on the ground. After receiving the positioning instruction by using the transmission communications module 204, the transmission control module 203 of the power transmit device 20 may control the power transmit coil 201 to generate a magnetic field used for location detection, that is, the foregoing positioning magnetic field.

After the power transmit coil 201 generates the positioning magnetic field, and after the power receive device 10 enters a range of the positioning magnetic field with the electric vehicle, the power receive coil 101 and a location detection coil may generate induction signals.

Step 302: Detect a second induction signal of the location detection coil in the positioning magnetic field.

If the wireless charging alignment apparatus includes a plurality of location detection coils, a second induction signal of each location detection coil in the positioning magnetic field needs to be detected.

Step 303: Determine a location of the power receive coil relative to the power transmit coil based on the first induction signal and the second induction signal.

In this embodiment of this application, step 301 may be implemented by a first detection circuit 03 in the wireless charging alignment apparatus, step 302 may be implemented by a second detection circuit 04 in the wireless charging alignment apparatus, and step 303 may be implemented by a location determining circuit 05 in the wireless charging alignment apparatus.

In an optional implementation, step 303 may include:
determining, as the location of the power receive coil relative to the power transmit coil based on a correspondence between an offset location and each of an induction signal of the power receive coil and an induction signal of the location detection coil, an offset location corresponding to the first induction signal and the second induction signal.

For example, the process of determining, based on the correspondence, the offset location corresponding to the first induction signal and the second induction signal in step 303 may include the following steps:

Step S31: Determine a first difference between a signal value of the first induction signal and a signal value of the induction signal of the power receive coil in each signal group, and a second difference between a signal value of the second induction signal and a signal value of the induction signal of the location detection coil in each signal group, to obtain the first difference and the second difference of each signal group.

Step S32: Determine, as the offset location corresponding to the first induction signal and the second induction signal, an offset location corresponding to a signal group whose sum of the first difference and the second difference is the smallest in the plurality of signal groups.

Each of the first difference and the second difference may be an absolute value. For the process of determining the location of the power receive coil relative to the power transmit coil based on the correspondence, refer to the foregoing description.

In another optional implementation, step 303 may include:
determining a coupling coefficient between the power receive coil and the power transmit coil based on the first induction signal and a current or a voltage of the power transmit coil; and determining the location of the power receive coil relative to the power transmit coil based on the coupling coefficient and the second induction signal.

For the process of determining the location of the power receive coil relative to the power transmit coil based on the coupling coefficient and the second induction signal, refer to the foregoing description.

Optionally, step 303 may include: separately preprocessing the first induction signal and the second induction signal, where the preprocessing includes at least one of normalization processing and weighting processing; and determining the location of the power receive coil relative to the power transmit coil based on the preprocessed first induction signal and the preprocessed second induction signal. For the process of preprocessing the induction signals, refer to the foregoing description.

In this embodiment of this application, the first induction signal detected by the first detection circuit 03 may include at least one of a current and a voltage. The second induction signal detected by the second detection circuit 04 may also include at least one of a current and a voltage.

Optionally, referring to FIG. 5 to FIG. 7, the apparatus may further include a resonant element 06 and a first switch $S_1$. The power receive coil is connected to the resonant element 06 to form a resonant circuit. The first switch $S_1$ is connected in parallel to the resonant circuit.

Step 301 may include: controlling the first switch $S_1$ to be closed, and detecting a current flowing through the resonant circuit. In other words, the first induction signal may include the current flowing through the resonant circuit.

For example, the resonant element 06 may include a capacitor Cf and an inductor Lf. In this case, the current flowing through the resonant circuit may include at least one of a capacitor current and an inductance current.

Optionally, referring to FIG. 8, the apparatus may further include a second switch $S_2$. The second switch $S_2$ is connected in parallel to the power receive coil.

Step 301 may include: in a first time period, controlling the second switch $S_2$ to be closed, and detecting a short-circuit current flowing through the power receive coil. In other words, the first induction signal may include the short-circuit current flowing through the power receive coil.

Step 302 may include: in a second time period, controlling the second switch $S_2$ to be opened, and detecting the second induction signal of the location detection coil in the positioning magnetic field.

The second time period and the first time period may be two non-overlapping time periods. In other words, the short-circuit current and the second induction signal may be detected in a time division manner. When the second switch $S_2$ is closed and the power receive coil is short-circuited, the short-circuit current flowing through the power receive coil is an alternating current, and a magnetic field generated by the alternating current causes interference to the second induction signal generated by the location detection coil. Therefore, the short-circuit current and the second induction signal may be detected in a time division manner, to ensure reliability of the detected second induction signal.

It should be noted that, after the first switch $S_1$ is closed, the inductor, the capacitor, and the power receive coil form a resonant circuit. Because impedance of the inductor and the capacitor relative to the power receive coil is relatively large, the current flowing through the power receive coil is very small, so that no interference is caused to the detection of the second induction signal. Therefore, when the first induction signal includes the inductance current or the capacitor current, the detection of the inductance current or the capacitor current may be performed synchronously with the detection of the second induction signal.

Optionally, referring to FIG. 9, the apparatus may further include a third switch $S_3$. The third switch $S_3$ is separately connected to the power receive coil and a subsequent circuit of the power receive coil. Correspondingly, step 301 may include: controlling the third switch to be opened, and detecting an open-circuit voltage between two ends of the power receive coil. In other words, the first induction signal may further include the open-circuit voltage between the two ends of the power receive coil.

It should be noted that a sequence of steps of the wireless charging alignment method provided in this embodiment of this application may be appropriately adjusted, or steps may be correspondingly increased or decreased based on a situation. For example, step 301 and step 302 may be performed simultaneously, or step 302 may be performed before step 301. Variation or replacement readily figured out by a person skilled in the art within the technical scope disclosed in the present technology shall fall within the protection scope of the present technology.

In conclusion, the embodiments of this application provide the wireless charging alignment method. According to the method, the relative location of the two coils may be determined based on the detected induction signals. In this way, at least one of the power receive device and the power transmit device can adjust its location based on the relative location, so that the two coils are aligned. In the related technology, a driver visually measures a relative location of the two coils. In comparison with the related technology, in this embodiment of this application, both precision and efficiency of determining the relative location based on the induction signals are higher. Therefore, alignment precision and alignment efficiency of the two coils can be effectively improved.

In addition, according to the method, the second induction signal of the location detection coil may be detected, and the first induction signal of the power receive coil may be further detected. A size and a coverage area of the power receive coil are both larger than those of the location detection coil. The power receive coil has a relatively large difference from the location detection coil in terms of features. Therefore, precision of the relative location determined based on the two types of induction signals is higher, thereby effectively ensuring the alignment precision of the two coils.

An embodiment of this application further provides a wireless charging system. Referring to FIG. 1 and FIG. 2, the wireless charging system includes a power transmit device 20 and a power receive device 10. At least one of the power transmit device 20 and the power receive device 10 may include the wireless charging alignment apparatus provided in the foregoing embodiment.

When the wireless charging alignment apparatus is applied to the power transmit device 20, the power receive coil described above may also be referred to as a power transmit coil, and the power transmit coil may also be referred to as a power receive coil.

An embodiment of this application further provides an electric vehicle. The electric vehicle may include the wireless charging alignment apparatus provided in the foregoing embodiment. For example, the electric vehicle may include a power receive device 10, and the power receive device 10 includes the wireless charging alignment apparatus provided in the foregoing embodiment.

It should be understood that the location determining circuit 05 of the wireless charging alignment apparatus in this embodiment of this application may alternatively be implemented by using an application-specific integrated circuit (ASIC) or a programmable logic device (PLD). The PLD may be a complex program logic device (CPLD), a field-programmable gate array (FPGA), generic array logic (GAL), or any combination thereof. Optionally, the step of determining the location of the power receive coil relative to the power transmit coil in the wireless charging alignment method provided in the foregoing method embodiment may also be implemented by using software. When this step is implemented by using software, the circuit (that is, the location determining circuit 05) configured to implement this step in the wireless charging alignment apparatus may be a software module.

Figure 14:
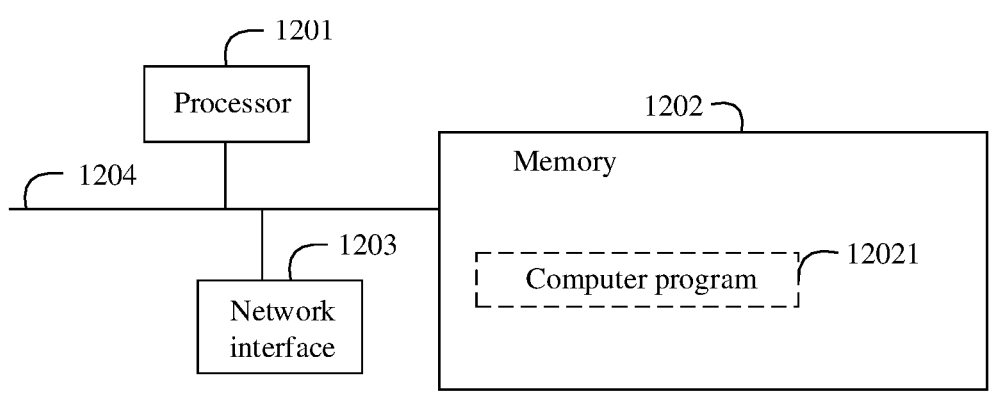
FIG. 14 is an example schematic structural diagram of a location determining circuit in a wireless charging alignment apparatus according to an embodiment of this application.

FIG. 14 is a schematic structural diagram of a location determining circuit in a wireless charging alignment apparatus according to an embodiment of this application. Referring to FIG. 14, the location determining circuit may include a processor 1201, a memory 1202, a network interface 1203, and a bus 1204. The bus 1204 is configured to connect the processor 1201, the memory 1202, and the network interface 1203. A communication connection to another device may be implemented by using the network interface 1203 (which may be wired or wireless). The memory 1202 stores a computer program 12021, and the computer program 12021 is configured to implement various application functions.

It should be understood that in the embodiment of this application, the processor 1201 may be a CPU, or the processor 1201 may be another general purpose processor, a digital signal processor (DSP), an application-specific integrated circuit (ASIC), a field programmable gate array (FPGA), a GPU or another programmable logic device, a discrete gate or a transistor logic device, a discrete hardware component, or the like. The general purpose processor may be a microprocessor, any conventional processor, or the like.

The memory 1202 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs may be used, for example, a static random access memory (SRAM), a dynamic random access memory (DRAM), a synchronous dynamic random access memory (s SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

The bus 1204 may further include a power bus, a control bus, a status signal bus, and the like, in addition to a data bus. However, for clear description, various types of buses in the figure are marked as the bus 1204.

The processor 1201 is configured to execute the computer program stored in the memory 1202. The processor 1201 executes the computer program 12021 to implement the step of determining the location of the power receive coil relative to the power transmit coil in the foregoing method embodiment.

An embodiment of this application further provides a computer readable storage medium. The computer readable storage medium stores an instruction. When the computer readable storage medium runs on a computer, the computer is enabled to perform the step of determining the location of the power receive coil relative to the power transmit coil in the foregoing method embodiment.

An embodiment of this application further provides a computer program product including an instruction. When the computer program product runs on a computer, the computer is enabled to perform the step of determining the location of the power receive coil relative to the power transmit coil in the foregoing method embodiment.

It should be noted that, in this embodiment of this application, "at least one" means one or more, and "a plurality of" means two or more. The term "and/or" describes an association relationship between associated objects and represents that at least three relationships may exist. For example, A and/or B may represent the following three cases: Only A exists, both A and B exist, and only B exists. A and B may be in a singular or plural form. The character "/" generally indicates an "or" relationship between the associated objects.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A wireless charging alignment apparatus, comprising:
   a power receive coil;
   a location detection coil;
   a first detection circuit;
   a second detection circuit; and
   a location determining circuit, wherein
      the power receive coil is configured to exchange power with a power transmit coil of through electromagnetic mutual inductance,
      the first detection circuit is configured to detect a first induction signal of the power receive coil in a positioning magnetic field generated by the power transmit coil,
      the second detection circuit is configured to detect a second induction signal of the location detection coil in the positioning magnetic field, and
      the location determining circuit is configured to determine, as a location of the power receive coil relative to the power transmit coil based on a correspondence between an offset location and each of an induction signal of the power receive coil and an induction signal of the location detection coil, the offset location corresponding to the first induction signal and the second induction signal, wherein
      the location determining circuit is further configured to:
         determine a first difference between a signal value of the first induction signal and a signal value of the induction signal of the power receive coil in each signal group from a plurality of signal groups, and a second difference between a signal value of the second induction signal and a signal value of the induction signal of the location detection coil in each signal group from the plurality of signal groups, to obtain the first difference and the second difference of each signal group, respectively; and
         determine, as the offset location corresponding to the first induction signal and the second induction signal, the offset location corresponding to a signal group whose sum of the first difference and the second difference is the smallest in the plurality of signal groups.

2. The wireless charging alignment apparatus according to claim 1, wherein
   the plurality of signal groups and an offset location corresponding to each signal group may be recorded, and each signal group comprises the signal value of the induction signal of the power receive coil and the signal value of the induction signal of the location detection coil.

3. The wireless charging alignment apparatus according to claim 1, wherein each of the first induction signal, the second induction signal, the induction signal of the power receive coil, and the induction signal of the location detection coil comprises at least one of a current and a voltage; and
   a type of the first induction signal is the same as a type of the induction signal of the power receive coil, and a type of the second induction signal is the same as a type of the induction signal of the location detection coil.

4. The wireless charging alignment apparatus according to claim 1, wherein the location determining circuit is configured to:

determine a coupling coefficient between the power receive coil and the power transmit coil based on the first induction signal and a current or a voltage of the power transmit coil; and determine the location of the power receive coil relative to the power transmit coil based on the coupling coefficient and the second induction signal.

5. The wireless charging alignment apparatus according to claim 1, wherein the location determining circuit is configured to:

separately preprocess the first induction signal and the second induction signal, and determine the location of the power receive coil relative to the power transmit coil based on the preprocessed first induction signal and the preprocessed second induction signal, wherein preprocessing the first induction signal and the second induction signal comprises at least one of normalization processing and weighting processing.

6. The wireless charging alignment apparatus according to claim 1, wherein the first induction signal comprises a current, the wireless charging alignment apparatus further comprises a resonant element and a first switch, the power receive coil is connected to the resonant element to form a resonant circuit, and the first switch is connected in parallel to the resonant circuit; and the first detection circuit is configured to: when the first switch is closed, detect the current flowing through the resonant circuit.

7. The wireless charging alignment apparatus according to claim 6, wherein the resonant element comprises: an inductor connected in series to the power receive coil, and a capacitor connected in parallel to the power receive coil; and the current detected by the first detection circuit comprises at least one of an inductance current flowing through the inductor and a capacitor current flowing through the capacitor.

8. The wireless charging alignment apparatus according to claim 1, wherein the first induction signal comprises a current, the wireless charging alignment apparatus further comprises a first switch, and the first switch is connected in parallel to the power receive coil; and the first detection circuit is configured to: when the first switch is closed, detect a short-circuit current flowing through the power receive coil.

9. The wireless charging alignment apparatus according to claim 1, wherein the first induction signal comprises a voltage, the apparatus further comprises a first switch, and the first switch is connected between the power receive coil and a subsequent circuit of the power receive coil; and the first detection circuit is configured to: when the first switch is opened, detect an open-circuit voltage between two ends of the power receive coil.

10. A wireless charging alignment method, comprising:

detecting a first induction signal of a power receive coil in a positioning magnetic field generated by a power transmit coil;

detecting a second induction signal of a location detection coil in the positioning magnetic field; and determining, as a location of the power receive coil relative to the power transmit coil based on a correspondence between an offset location and each of an induction signal of the power receive coil and an induction signal of the location detection coil, the offset location corresponding to the first induction signal and the second induction signal, wherein the power receive coil is configured to exchange power with a power transmit coil through electromagnetic mutual inductance, and determining the offset location corresponding to the first induction signal and the second induction signal comprises:

determining a first difference between a signal value of the first induction signal and a signal value of the induction signal of the power receive coil in each signal group from a plurality of signal groups, and a second difference between a signal value of the second induction signal and a signal value of the induction signal of the location detection coil in each signal group from the plurality of signal groups, to obtain the first difference and the second difference of each signal group, respectively; and determining, as the offset location corresponding to the first induction signal and the second induction signal, the offset location corresponding to a signal group whose sum of the first difference and the second difference is the smallest in the plurality of signal groups.

11. The method according to claim 10, wherein the plurality of signal groups and an offset location corresponding to each signal group may be recorded, and each signal group comprises the signal value of the induction signal of the power receive coil and the signal value of the induction signal of the location detection coil.

12. The method according to claim 10, wherein determining the location of the power receive coil relative to the power transmit coil based on the first induction signal and the second induction signal comprises:

determining a coupling coefficient between the power receive coil and the power transmit coil based on the first induction signal and a current or a voltage of the power transmit coil; and determining the location of the power receive coil relative to the power transmit coil based on the coupling coefficient and the second induction signal.

13. The method according to claim 10, wherein determining the location of the power receive coil relative to the power transmit coil based on the first induction signal and the second induction signal comprises:

separately preprocessing the first induction signal and the second induction signal, wherein preprocessing the first induction signal and the second induction signal comprises at least one of normalization processing and weighting processing; and determining the location of the power receive coil relative to the power transmit coil based on the preprocessed first induction signal and the preprocessed second induction signal.

14. The method according to claim 10, wherein the first induction signal comprises a current, the power receive coil is connected to a resonant element to form a resonant circuit, and the resonant circuit is connected in parallel to a first switch; and detecting the first induction signal of the power receive coil comprises:

controlling the first switch to be closed, and detecting the current flowing through the resonant circuit.

15. The method according to claim 10, wherein the first induction signal comprises a current, and the power receive coil is connected in parallel to a first switch;

detecting the first induction signal of the power receive coil comprises:
  in a first time period, controlling the first switch to be closed, and detecting a short-circuit current flowing through the power receive coil; and
detecting the second induction signal of the location detection coil comprises:
  in a second time period, controlling the first switch to be opened, and detecting the second induction signal of the location detection coil in the positioning magnetic field, wherein
the second time period and the first time period are two non-overlapping time periods.

16. The method according to claim 10, wherein the first induction signal comprises a voltage, and the power receive coil is connected to a subsequent circuit of the power receive coil by using a first switch; and
detecting the first induction signal of the power receive coil comprises:
  controlling the first switch to be opened, and detecting an open-circuit voltage between two ends of the power receive coil.

17. A wireless charging system, comprising:
a power transmit device; and
a power receive device, wherein at least one of the power transmit device and the power receive device includes a wireless charging alignment apparatus, wherein the wireless charging alignment apparatus comprises:
  a power receive coil,
  a location detection coil,
  a first detection circuit,
  a second detection circuit, and
  a location determining circuit, wherein
the power receive coil is configured to exchange power with a power transmit coil through electromagnetic mutual inductance;
the first detection circuit is configured to detect a first induction signal of the power receive coil in a positioning magnetic field generated by the power transmit coil;
the second detection circuit is configured to detect a second induction signal of the location detection coil in the positioning magnetic field; and
the location determining circuit is configured to determine, as a location of the power receive coil relative to the power transmit coil based on a correspondence between an offset location and each of an induction signal of the power receive coil and an induction signal of the location detection coil, the offset location corresponding to the first induction signal and the second induction signal, wherein
the location determining circuit is further configured to:
  determine a first difference between a signal value of the first induction signal and a signal value of the induction signal of the power receive coil in each signal group from a plurality of signal groups, and a second difference between a signal value of the second induction signal and a signal value of the induction signal of the location detection coil in each signal group from the plurality of signal groups, to obtain the first difference and the second difference of each signal group, respectively; and
  determine, as the offset location corresponding to the first induction signal and the second induction signal, the offset location corresponding to a signal group whose sum of the first difference and the second difference is the smallest in the plurality of signal groups.

18. The wireless charging system of claim 17, wherein
the plurality of signal groups and an offset location corresponding to each signal group may be recorded, and each signal group comprises the signal value of the induction signal of the power receive coil and the signal value of the induction signal of the location detection coil.

19. An electric vehicle, comprising:
a wireless charging alignment apparatus, wherein the wireless charging alignment apparatus comprises:
  a power receive coil,
  a location detection coil,
  a first detection circuit,
  a second detection circuit, and
  a location determining circuit, wherein
the power receive coil is configured to exchange power with a power transmit coil through electromagnetic mutual inductance;
the first detection circuit is configured to detect a first induction signal of the power receive coil in a positioning magnetic field generated by the power transmit coil;
the second detection circuit is configured to detect a second induction signal of the location detection coil in the positioning magnetic field; and
the location determining circuit is configured to determine, as a location of the power receive coil relative to the power transmit coil based on a correspondence between an offset location and each of an induction signal of the power receive coil and an induction signal of the location detection coil, the offset location corresponding to the first induction signal and the second induction signal, wherein
the location determining circuit is further configured to:
  determine a first difference between a signal value of the first induction signal and a signal value of the induction signal of the power receive coil in each signal group from a plurality of signal groups, and a second difference between a signal value of the second induction signal and a signal value of the induction signal of the location detection coil in each signal group from the plurality of signal groups, to obtain the first difference and the second difference of each signal group, respectively, and
  determine, as the offset location corresponding to the first induction signal and the second induction signal, the offset location corresponding to a signal group whose sum of the first difference and the second difference is the smallest in the plurality of signal groups.

20. The electric vehicle of claim 19, wherein
the plurality of signal groups and an offset location corresponding to each signal group may be recorded, and each signal group comprises the signal value of the induction signal of the power receive coil and the signal value of the induction signal of the location detection coil.

* * * * *